(12) United States Patent
Kittaka et al.

(10) Patent No.: US 7,688,512 B2
(45) Date of Patent: Mar. 30, 2010

(54) TRANSMISSIVE DIFFRACTION GRATING, AND SPECTRAL SEPARATION ELEMENT AND SPECTROSCOPE USING THE SAME

(75) Inventors: Shigeo Kittaka, Tokyo (JP); Kentaro Yamada, Tokyo (JP); Tatsuhiro Nakazawa, Tokyo (JP); Keiji Tsunetomo, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 418 days.

(21) Appl. No.: 11/901,940

(22) Filed: Sep. 19, 2007

(65) Prior Publication Data

US 2008/0074748 A1    Mar. 27, 2008

(30) Foreign Application Priority Data

Sep. 21, 2006    (JP)    ............................. 2006-256284

(51) Int. Cl.
*G02B 5/18*    (2006.01)
(52) U.S. Cl. ...................................... 359/576
(58) Field of Classification Search ................ 359/566, 359/569, 571, 576; 356/305, 328
See application file for complete search history.

(56) References Cited

U.S. PATENT DOCUMENTS 7,554,734 B1 *    6/2009    Holm et al. .................. 359/576
2004/0212890 A1    10/2004    Shiozaki et al.
2005/0152037 A1    7/2005    Shiozaki et al.
2005/0200957 A1*    9/2005    Hikichi et al. ............... 359/569
2007/0058915 A1    3/2007    Kittaka et al.

FOREIGN PATENT DOCUMENTS

WO    2004/074888    9/2004
WO    2004/081625    9/2004

OTHER PUBLICATIONS

Shiozaki, et al., "Polarization-independent design of multilayered diffraction gratings having large angular dispersion", SEI Technical Review, Sep. 2004, No. 165, pp. 38-42 with its English abstract.

* cited by examiner

*Primary Examiner*—Alessandro Amari
(74) *Attorney, Agent, or Firm*—Hamre, Schumann, Mueller & Larson, P.C.

(57) ABSTRACT

A transmissive diffraction grating includes a substrate and a plurality of ridges provided in a mutually parallel manner at constant periodicity p on the substrate. The ridges include a first layer, a second layer (refractive index $n_2$: 2.0-2.5), and a third layer with non-continuous refractive indices, arranged in that order from the substrate outward. The first layer adjacent the substrate, in terms of its refractive index, exhibits a difference of 0.1 or less relative to the substrate. The second layer has a higher refractive index than the first layer and third layer and satisfies the following conditions. For a single ridge, the cross-sectional area S of a cross-section of the second layer perpendicular to the longitudinal direction of said ridge is in the range of $0.75p^2 k_1 \theta^2/(n_2-1)<S<1.20p^2 k_1 \theta^2/(n_2-1)$, were, $\theta$ is the angle of incidence onto the diffraction grating face, expressed in radian units, and the constant $k_1$ is 1.1. The thickness $d_2$ of the second layer is in the range of $0.70pk_2\theta n_2/(n_2-1)<d_2<1.30pk_2\theta n_2/(n_2-1)$, where, the constant $k_2$ is 0.69.

15 Claims, 25 Drawing Sheets

… (US 7,688,512 B2)

TRANSMISSIVE DIFFRACTION GRATING, AND SPECTRAL SEPARATION ELEMENT AND SPECTROSCOPE USING THE SAME

BACKGROUND OF THE INVENTION

1. Field of the Invention

The present invention relates to a transmissive diffraction grating, and to a spectral separation element and a spectroscope using the same.

2. Description of Related Art

Spectroscopes, which separate light of different wavelengths, are used widely in measuring equipment, including spectrometers, as well as in reading and writing heads of optical disk recording/reproducing devices, in optical communications, etc. In addition, various diffraction gratings are used as spectral separation elements in such spectroscopes.

Diffraction gratings used for spectroscopy preferably are characterized by a significant wavelength-dependent angular dispersion and a diffraction efficiency (the ratio of the intensities of diffracted light of a specific order and incident light) that is near 100%. Moreover, in applications where the direction of polarization of incident light is not specified, they are also required to have a small difference in diffraction efficiency between TE-polarized light and TM-polarized light, i.e. a small polarization dependent loss (PDL).

A diffraction grating with a multilayer structure, such as the one shown in FIG. 36, has been proposed as a diffraction grating satisfying the above-described conditions and having a structure that is easy to fabricate (for example, see Manabu Shiozaki, Masaichi Mobara "Polarization-independent design of multilayered diffraction gratings having large angular dispersion", SEI Technical Review, September 2004, No. 165, pp. 38-42). As shown in FIG. 36, in a diffraction grating 110, a glass substrate is used as a substrate 10 with a low refractive index, and ridges 21 including a high refractive index layer 12 and a low refractive index layer 13 are provided on the substrate 10. When light 50 is incident upon the diffraction grating 110 from the direction of the ridges 21 at a predetermined angle of incidence θ, normal to longitudinal direction of the ridges 21, first-order diffracted light 51 passes through, and is emitted from, the substrate 10. In such a case, providing the low refractive index layer 13 reduces reflectance, and, as a result, improves the efficiency of diffraction of the first-order diffracted light 51.

The diffraction grating 110 shown in FIG. 36 is commonly fabricated according to the following processes (1) to (4).

(1) First of all, the material of the high refractive index layer 12 and material of the low refractive index layer 13 are deposited successively on the substrate 10.

(2) Next, a mask pattern is formed on the surface of the material of the low refractive index layer 13.

(3) Then, portions other than the mask pattern are etched away.

(4) Finally, the mask pattern is removed.

However, if the depth of etching is insufficient during the fabrication of the diffraction grating 110 of FIG. 36, then, as shown in FIG. 37, the high refractive index layer 12 remains at the bottom of the grooves 30. The high refractive index layer 12 remaining at the bottom of the grooves 30 causes a significant deterioration in the characteristics of a diffraction grating 120. Accordingly, it was necessary to control the depth of etching stringently when fabricating the diffraction grating 110 of FIG. 36.

Moreover, while it is more advantageous to have a larger number of design parameters in order to improve diffraction efficiency and reduce PDL, in case of the diffraction grating 110 of FIG. 36, the relatively freely variable design parameters include three parameters, such as the thickness of the high refractive index layer 12, the thickness of the low refractive index layer 13, and the width W of the ridges 21, which cannot be considered a sufficient number of design parameters for improving diffraction efficiency and reducing PDL. Additionally, because refractive indices depend on the material used, it is difficult to freely select their values.

Accordingly, in order to eliminate such problems, a diffraction grating has been proposed that has a three-layer ridge structure including a first layer, a second layer, and a third layer with non-continuous refractive indices (e.g. see International Publication No. WO2004/074888).

Although the shape of the cross-section of the ridges perpendicular to their longitudinal direction in the diffraction grating disclosed in International Publication No. WO2004/074888 is rectangular (with a constant width), in some cases it is technically difficult to keep the width of the ridges constant. In other words, fabrication of the diffraction grating disclosed in International Publication No. WO2004/074888 is extremely difficult. Also, if the shape of the ridges deviates from the design values, diffraction efficiency, PDL, and other characteristics may deteriorate.

SUMMARY OF THE INVENTION

The present invention was made in order to eliminate the aforementioned problems of the conventional technology and it is an object of the invention to provide a transmissive diffraction grating that can be fabricated easily while permitting suppression of deterioration in characteristics, as well as a spectral separation element and a spectroscope using the same.

In order to attain the object, the transmissive diffraction grating according to the present invention is a transmissive diffraction grating including a substrate and a plurality of ridges, provided parallel to one another at constant periodicity p on the substrate. The ridges include a first layer, a second layer, and a third layer with non-continuous refractive indices arranged in that order from the substrate outward, the first layer adjacent the substrate, in terms of its refractive index, exhibits a difference of 0.1 or less relative to the substrate, the second layer has a higher refractive index than the first layer and third layer and satisfies the following conditions (A) to (C).

(A) The refractive index $n_2$ of the second layer is 2.0 to 2.5.

(B) For a single ridge, the cross-sectional area S of a cross-section of the second layer perpendicular to the longitudinal direction of said ridge is in the range of $0.75\, p^2 k_1 \theta^2/(n_2-1) < S < 1.20\, p^2 k_1 \theta^2/(n_2-1)$, where, θ is the angle of incidence onto the diffraction grating face, expressed in radian units, and the constant $k_1$ is 1.1.

(C) The thickness $d_2$ of the second layer is in the range of $0.70\, pk_2 \theta n_2/(n_2-1) < d_2 < 1.30\, pk_2 \theta n_2/(n_2-1)$, where, the constant $k_2$ is 0.69.

Moreover, in the configuration of the transmissive diffraction grating according to the present invention, a cross-section of a ridge perpendicular to the longitudinal direction of the ridge includes a substantially rectangular first portion adjacent the substrate and an outwardly converging tapered second portion adjacent the first portion, and the height $h_1$ of the first portion from the surface of the substrate preferably is in the range of $0.2\, h < h_1 < 0.7\, h$, where the height of the ridge from the surface of the substrate is designated as h, and the angle $\phi_1$ between the normal to the surface of the substrate and the side face of the ridge in the first portion and the angle $\phi_2$ between the normal to the surface of the substrate and the side face of the ridge in the second portion preferably is in the range $0°<\phi_1<5°$, $\phi_1<\phi_2<15°$.

Moreover, in the configuration of the transmissive diffraction grating of the present invention, a plurality of mutually parallel second ridges preferably are provided periodically on the face of the substrate on the side opposite the diffraction grating face.

Moreover, in the configuration of the transmissive diffraction grating of the present invention, the refractive index of the first layer preferably is the same as the refractive index of the substrate.

Moreover, in the configuration of the transmissive diffraction grating of the present invention, the refractive index of the first layer preferably is the same as the refractive index of the third layer.

Moreover, in the configuration of the transmissive diffraction grating of the present invention, it is preferable for the first layer to be made of silicon dioxide and for the substrate to be made of quartz glass.

Moreover, in the configuration of the transmissive diffraction grating of the present invention, the first layer preferably includes a portion of the substrate and, in such a case, the substrate preferably is made of quartz glass.

Moreover, in the configuration of the transmissive diffraction grating of the present invention, the second layer is made of at least one type of material selected from the group consisting of $Ta_2O_5$, $TiO_2$, and $Nb_2O_5$, and it is preferable for it to be made of $Ta_2O_5$.

Also, in the configuration of the transmissive diffraction grating of the present invention, the second layer, which is a high refractive index layer, preferably is adapted so as to be divided into two portions sandwiching a low refractive index layer.

In addition, in the configuration of the transmissive diffraction grating of the present invention, the angle of incidence $\theta$ during reception of light normal to the longitudinal direction of the ridges preferably satisfies the condition $|\theta-\theta_0|<10°$. Here, $\theta_0$ is defined by $n_i \cdot \sin\theta_0 \cdot (p/\lambda_0)=0.5$, in which $\lambda_0$ is the center value of the wavelength band of incident light in a vacuum, and $n_i$ is the refractive index of the medium on the entrance side.

Moreover, the configuration of the spectral separation element according to the present invention makes use of a plurality of transmissive diffraction gratings of the present invention.

In addition, the configuration of the spectroscope according to the present invention makes use of the transmissive diffraction grating of the present invention or the spectral separation element of the present invention.

The present invention provides a transmissive diffraction grating that can be fabricated easily while permitting suppression of deterioration in characteristics, as well as a spectral separation element and a spectroscope using the same.

BRIEF DESCRIPTION OF THE DRAWINGS

FIG. 4 shows graphs showing the diffraction efficiency of diffracted light versus the thickness of the first low refractive index layer in Design Example 1 of Embodiment 1 of the present invention, wherein

FIG. 5 shows graphs showing the diffraction efficiency of diffracted light versus the thickness of the high refractive index layer in Design Example 1 of Embodiment 1 of the present invention, wherein

FIG. 6 shows graphs showing the diffraction efficiency of diffracted light versus the thickness of the second low refractive index layer in Design Example 1 of Embodiment 1 of the present invention, wherein

FIG. 7 shows graphs showing the diffraction efficiency of diffracted light versus the width of the ridges in Design Example 1 of Embodiment 1 of the present invention, wherein

FIG. 8 shows graphs showing the diffraction efficiency of diffracted light versus the refractive index of the high refractive index layer in Design Example 1 of Embodiment 1 of the present invention, wherein FIG. 8A illustrates TE-polarized light and FIG. 5B illustrates TM-polarized light.

DETAILED DESCRIPTION OF THE INVENTION

Below, the present invention is explained more specifically with reference to embodiments.

Embodiment 1

Figure 1:
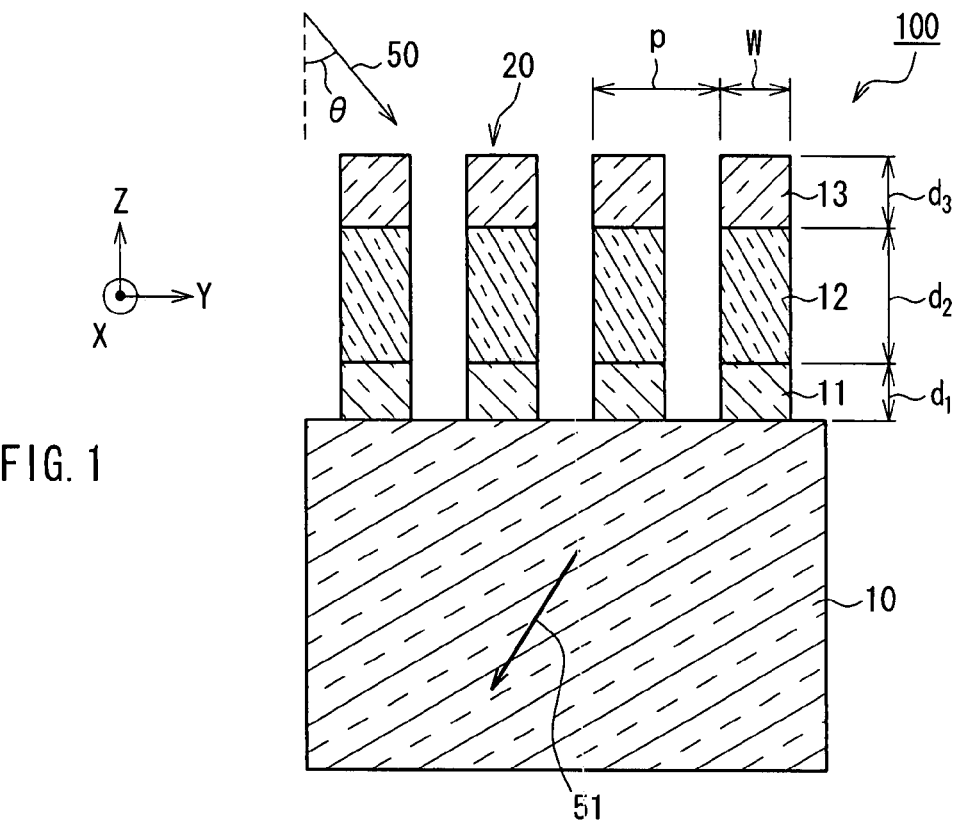
FIG. 1 is a cross-sectional view schematically illustrating a transmissive diffraction grating in Embodiment 1 of the present invention.

FIG. 1 is a cross-sectional view schematically illustrating a transmissive diffraction grating in Embodiment 1 of the present invention.

As shown in FIG. 1, a transmissive diffraction grating (which is referred simply to as "diffraction grating" below) 100 of the present embodiment includes a substrate 10 and a plurality of rectangular ridges 20 provided in a mutually parallel manner at constant periodicity p on the substrate 10. Here, the ridges 20 are made of three layers arranged in succession from the substrate 10 outward: a first low refractive index layer (first layer) 11, a high refractive index layer (second layer) 12, and a second low refractive index layer (third layer) 13. The high refractive index layer 12 has a higher refractive index in comparison with the first low refractive index layer 11 and second low refractive index layer 13. In the present specification, the term "high refractive index layer" is used to refer to a layer made of material with a refractive index of 1.6 or higher, and the term "low refractive index layer" is used to refer to a layer made of material with a refractive index of less than 1.6.

The high refractive index layer 12 constitutes the main body of the diffraction grating 100. If the ridges 20 were made entirely of a low refractive index material (for instance, silicon dioxide ($SiO_2$)), the proportion of the depth of the grooves 30 relative to the periodicity p would be extremely large and etching-based processing would present difficulties. By contrast, if the refractive index of the ridges 20 is increased (e.g. to 2.0 or higher), the height of the ridges 20 can be reduced, which facilitates fabrication.

However, a high refractive index material has a higher Fresnel reflection at its air interface and, consequently, reduces diffraction efficiency. Therefore, in the present embodiment, a second low refractive index layer 13 is provided as a low refractive index layer at the tip of the ridges 20. Doing so produces well-known antireflection film effects, and the Fresnel reflection decreases. However, since the reflection and refraction of light in the diffraction grating is more complex than that of a planar multi-layer film, ordinary antireflection film design techniques cannot be applied as it is in designing the thickness of the second low refractive index layer 13 and optimization has to be performed for the diffraction grating as a whole.

Figure 2:
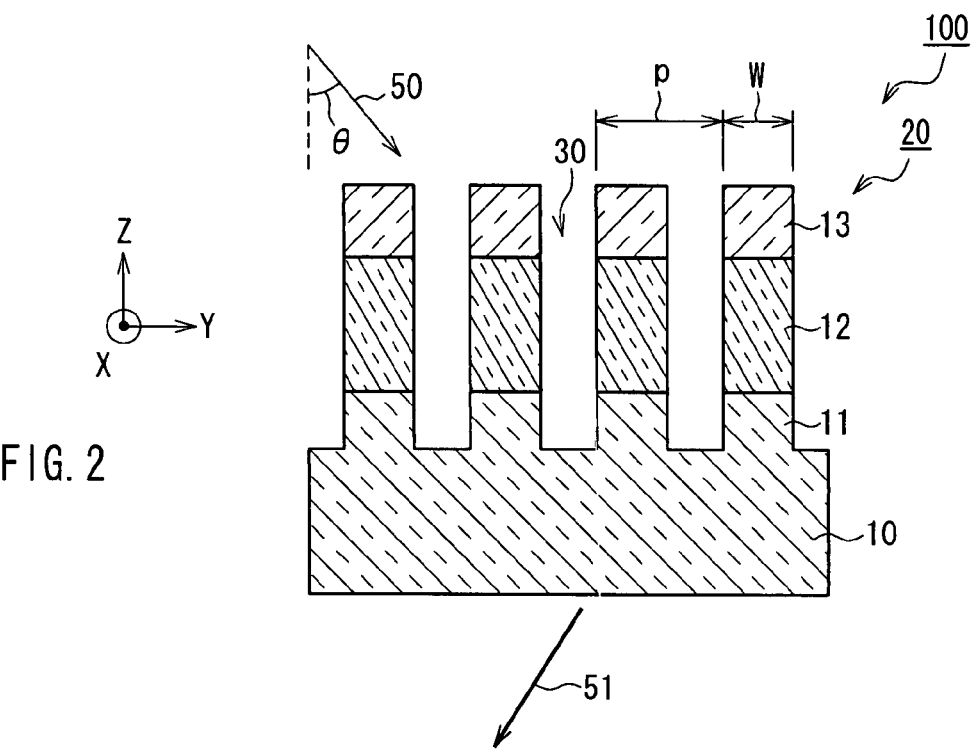
FIG. 2 is a cross-sectional view schematically illustrating another example of the transmissive diffraction grating in Embodiment 1 of the present invention.

In terms of their refractive indices, the difference between the first low refractive index layer 11 and the substrate 10 preferably is not more than 0.1, and, even more preferably, the refractive index of the first low refractive index layer 11 is the same as that of the substrate 10. Moreover, as shown in FIG. 2, the first low refractive index layer 11 may constitute a portion of the substrate 10. In such a case, there is no need to form the material of the first low refractive index layer 11 separately on the substrate 10 and it may be sufficient to form only the material of the high refractive index layer 12 and the material of the second low refractive index layer 13 on the substrate 10, and form the grooves 30 in the substrate 10 to a depth corresponding to the first low refractive index layer 11.

In the present embodiment, providing the first low refractive index layer 11 makes it possible to increase the tolerance of the etching depth. Although the thickness of the first low refractive index layer 11 changes if the etching depth deviates from the design value, the resultant change in characteristics is extremely smooth, as will be described below. In this manner, the present embodiment makes it possible to increase the tolerance range of the etching depth and, therefore, permits easy fabrication of diffraction gratings. Moreover, adjusting the thickness of the first low refractive index layer 11 provides for a greater degree of freedom in design, and, therefore, permits fabrication of diffraction gratings with higher characteristics.

The height $d_1$ of the first low refractive index layer 11 preferably is more than 0.05 p. Here, p is the periodicity of the diffraction gratings. When $d_1$ is less than 0.05 p, the effect of improving the characteristics is reduced.

(Reference Data)

A minimum value of $d_1$: 0.05 p (the hereinafter described Design Example 23)

A maximal value of $d_1$: 0.6175 p (the hereinafter described Design Example 22)

The second low refractive index layer 13, i.e. the topmost layer, which has a lower refractive index than the high refractive index layer 12, serves as an antireflection film reducing Fresnel reflection on the surface of the high refractive index layer 12, as described above.

In the diffraction grating 100 of the present embodiment, there are four relatively freely variable design parameters, including the thickness of the first low refractive index layer 11, the thickness of the high refractive index layer 12, the thickness of the second low refractive index layer 13, and the width W of the ridges 20. Optimizing them makes it possible to increase the characteristics of the diffraction grating 100, i.e. improve diffraction efficiency and reduce PDL.

The propagation of light in the film thickness direction is important in a "diffraction grating that is thick in the film thickness direction (Z-axis direction)", such as the one shown in FIG. 1 and FIG. 2. A diffraction grating that is thick in the film thickness direction can be considered a one-dimensional photonic crystal, wherein the wave vector representing the wavelength and direction of propagation of propagating light is determined by the shape of the photonic band. Because the photonic band is characterized by an abrupt bend in the vicinity of the Brillouin zone boundary, this characteristic makes it possible to produce a wide wavelength band, within which the efficiency of diffraction is high. The condition required for coupling incident light to the band at the Brillouin zone boundary is $n_i \cdot \sin\theta_0 \cdot (p/\lambda_0) = 0.5$, which is a desirable condition (for instance, see International Publication No. WO2004/081625). Here, the wavelength of incident light in a vacuum (in case of the spectral separation element, the center value of the wavelength band used) is designated as $\lambda_0$, the refractive index of the medium on the entrance side is designated as $n_i$, the periodicity of the diffraction grating (which is referred to also as "grating periodicity" below) is designated as p, and the angle of incidence is designated as $\theta_0$. It should be noted that the term "angle of incidence" is a value obtained for a medium with a refractive index of $n_i$ and in the following description $n_i=1.0$. Also, unless explicitly stated otherwise, the term "angle of incidence" refers to a value obtained in a medium with a refractive index of 1.0.

However, depending on the shape of the photonic band, the optimum value of the angle of incidence may be somewhat different from the $\theta_0$ defined by the above-mentioned formula, which is why it is desirable that the condition $|\theta - \theta_0| < 10°$ be satisfied.

There are no particular limitations concerning the material of the substrate 10 of the diffraction grating 100 of the present embodiment so long as its difference from the material of the first low refractive index layer 11 in terms of its refractive index is not more than 0.1. Specifically, the material of the substrate 10 preferably is low refractive index optical glass, quartz glass, crystallized glass, etc. that is highly transparent in the wavelength band being used and may contain other components so long as its difference from the material of the first low refractive index layer 11 in terms of its refractive index is not more than 0.1. In order to minimize temperature-dependent changes in grating periodicity, it is preferable to use quartz glass and crystallized glass having a low coefficient of thermal expansion as the material of the substrate 10. Quartz glass is most preferable because it is the most common substrate material and can be used "as is" in the first low refractive index layer 11.

There are no particular limitations concerning the material of the high refractive index layer 12 so long as the material has a refractive index of 1.6 or higher, and, preferably, a refractive index of about 2.0 to 2.5. Specifically, materials that easily lend themselves to deposition on the substrate 10, such as $Ta_2O_5$, $TiO_2$, $Nb_2O_5$, etc., or combinations thereof, are preferable for use as the material of the high refractive index layer 12 and may include other components so long as their refractive index is not less than 1.6. The processes used in their manufacture include vacuum deposition, sputtering, CVD, etc.

There are no particular limitations concerning the material of the second low refractive index layer 13 so long as its refractive index is less than 1.6. Specifically, materials exhibiting high transparency in a wide wavelength band, such as $SiO_2$ etc., are preferable and may include other components so long as their refractive index is less than 1.6. The processes used in their manufacture include vacuum deposition, sputtering, CVD, etc.

The diffraction grating 100 of FIG. 1 can be fabricated based on, for instance, the following processes.

(1) First of all, the material of the first low refractive index layer 11, the material of the high refractive index layer 12, and the material of the second low refractive index layer 13 are formed in the above-mentioned order on the substrate 10, and a metal film serving as a mask is deposited on the material of the second low refractive index layer 13, i.e. the topmost layer. Facing-targets sputtering, ion beam sputtering, vacuum deposition, ion plating, etc. can be used in the formation of the metal film. Materials commonly used for dry etching masks, such as Cr, Ni, Al, etc., can be used as the material of the metal film. Moreover, it is also possible to employ WSi and other metal compounds used for dry etching masks.

(2) Next, after depositing a resin film on top of the metal film by means of spin coating, a grating pattern is formed. UV photolithography, electron beam lithography, which uses electron beams, or nanoimprinting using a die press, etc. can be employed in the formation of the grating pattern. Depending on the pattern-forming technique, an appropriate photo-sensitive resin, thermoplastic resin, UV-curable resin, etc. can be used as the material of the resin film.

(3) Next, using the grating pattern (resin pattern) as a mask, the metal film formed in (1) above is dry etched to form a metal film pattern. Subsequently, using the metal film pattern as a mask, the material of the first low refractive index layer 11, the material of the high refractive index layer 12, and the material of the second low refractive index layer 13 formed in (1) above are dry etched to a predetermined depth to form ridges 20 including the first low refractive index layer 11, the high refractive index layer 12, and the second low refractive index layer 13. Finally, the remaining metal film is removed by dry etching or wet etching using liquid chemicals, etc. Reactive ion etching, ion beam etching, etc. can be used for dry etching. Moreover, a gas suited to the material being worked should be used as the etchant gas in this case, such as a fluorine-based gas for $SiO_2$, a chlorine-based gas for Cr, etc.

Moreover, the diffraction grating 100 of FIG. 1 also can be fabricated via the processes listed below, in which lilt-off is used in mask formation.

(1) First of all, after forming the material of the first low refractive index layer 11, the material of the high refractive index layer 12, and the material of the second low refractive index layer 13 in the above-mentioned order on the substrate 10 and depositing a resin film on the material of the second low refractive index layer 13, i.e. the topmost layer by means of spin coating, a grating pattern is formed. UV photolithography, electron beam lithography, which uses electron beams, or nanoimprinting using a die press, etc. can be employed in the formation of the grating pattern. Depending on the pattern-forming technique, an appropriate photosensitive resin, thermoplastic resin, UV-curable resin, etc. can be used as the material of the resin film.

(2) Next, after depositing a metal film on top of the grating pattern (resin pattern) formed in (1) above, the grating pattern is peeled off using organic solvents etc. At such time, the metal film deposited on the resin film is also simultaneously removed, and the metal film remains as a pattern only in those portions where the second low refractive index layer 13, i.e. the topmost layer, was exposed. Facing-target sputtering, ion beam sputtering, vacuum deposition, etc. can be used in the formation of the metal film.

(3) Next, using the metal film pattern as a mask, the material of the first low refractive index layer 11, the material of the high refractive index layer 12, and the material of the second low refractive index layer 13 formed in (1) above are dry etched to a predetermined depth to form ridges 20 including the first low refractive index layer 11, the high refractive index layer 12, and the second low refractive index layer 13. Finally, the remaining metal film pattern is removed by dry etching or wet etching using liquid chemicals, etc. Reactive ion etching, ion beam etching, etc. can be used for dry etching. Moreover, a gas suitable for the material being worked should be used as the etchant gas in this case, such as a fluorine-based gas for $SiO_2$, a chlorine-based gas for Cr, etc.

While the explanations above were provided regarding a case in which a first low refractive index layer 11, a high refractive index layer 12, and a second low refractive index layer 13 were formed on top of the substrate 10, as described above, a portion of the substrate 10 can be used as the first low refractive index layer 11 (see FIG. 2). In this case, the diffraction grating 100 is fabricated, for instance, in the following manner. Namely, first of all, the material of the high refractive index layer 12 and material of the second low refractive index layer 13 are formed on the substrate 10 in this order. Next, the metal film pattern formed on top of the material of the second low refractive index layer 13 is used as a mask to form the high refractive index layer 12 and second low refractive index layer 13 by dry etching. After that, the substrate 10 is etched to a depth corresponding to the thickness of the first low refractive index, layer 11. Finally, the metal film pattern is removed.

Design examples of the transmissive diffraction grating (FIG. 1) explained above are shown below.

As shown in FIG. 1, the periodicity of the diffraction grating 100 (grating periodicity) was designated as p, the width of the ridges 20 as W, and the thicknesses of the first low refractive index layer 11, high refractive index layer 12, and second low refractive index layer 13 respectively as $d_1$, $d_2$, and $d_3$. Moreover, the refractive indices of the first low refractive index layer 11, high refractive index layer 12, second low refractive index layer 13, and substrate 10 are designated respectively as $n_1$, $n_2$, $n_3$, and $n_s$. Regions other than the substrate 10 and ridges 20 are considered to be air (refractive index: 1).

The diffraction efficiency was calculated for a state in which plane waves (TE-polarized light and TM-polarized light) (light 50 above) with an incidence angle θ are incident on the diffraction grating 100 of FIG. 1 and first-order diffracted light 51 propagates inside the substrate 10. In the case of TE-polarized light, the direction of oscillation of the electric field is along the X axis (in the longitudinal direction of the ridges 20), whereas in case of TM-polarized light the direction of oscillation of the magnetic field is along the X axis. It should be noted that a calculation software program "DiffractMOD" from RSoft Design Group (U.S.), which is based on the RCWA (Rigorous Coupled Wave Analysis) technique, was used for the calculation of diffraction efficiency.

DESIGN EXAMPLE 1

First of all, explanations are provided regarding Design Example 1.

Results obtained in Design Example 1 are listed below (Table 1). In Design Example 1, the angle of incidence 0 onto the diffraction grating face was set to 45°, the periodicity p of the diffraction grating to 1 μm, the refractive index $n_2$ of the high refractive index layer 12 to 2.10, and the refractive index $n_1$ of the first low refractive index layer 11, the refractive index $n_3$ of the second low refractive index layer 13, and the refractive index $n_s$ of the substrate 10 to 1.46, while the other parameters were optimized, including the thickness $d_1$ of the first low refractive index layer 11, the thickness $d_2$ of the high refractive index layer 12, the thickness $d_3$ of the second low refractive index layer 13, and the width W of the ridges 20. The optimization was carried out with a view to increase the maximum value of diffraction efficiency as much as possible.

TABLE 1

Figure 9:
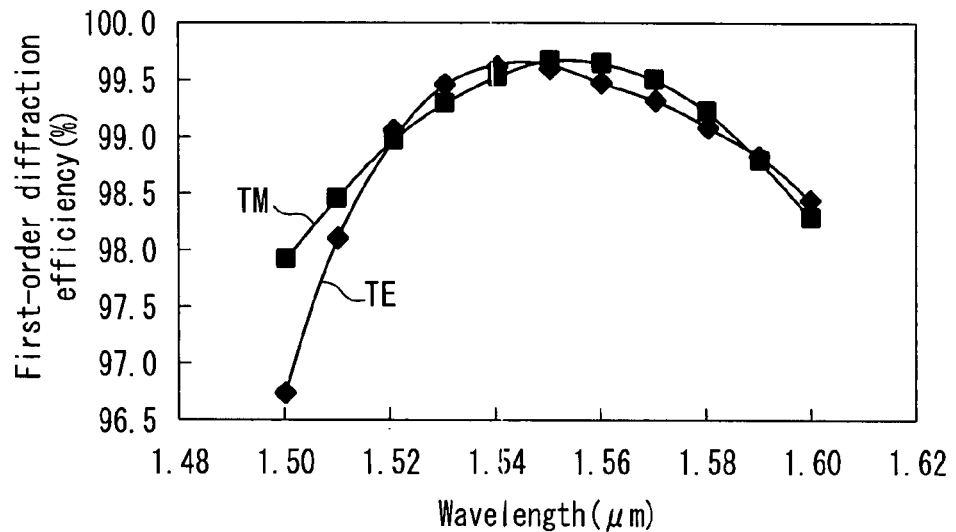
FIG. 9 is a graph showing the diffraction efficiency of first-order diffracted light versus the wavelength of incident light in Design Example 2 of Embodiment 1 of the present invention.
Figure 10:
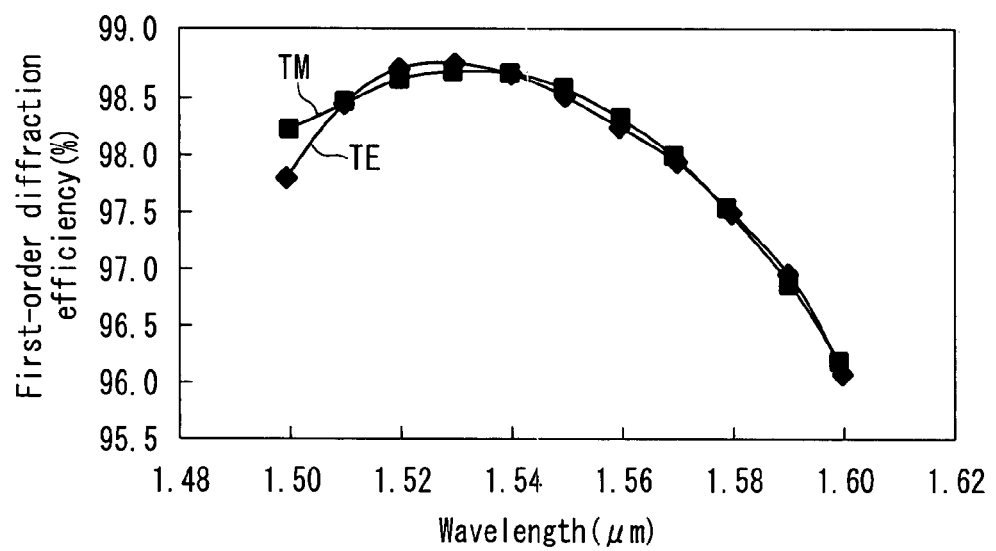
FIG. 10 is a graph showing the diffraction efficiency of first-order diffracted light versus the wavelength of incident light in Design Example 3 of Embodiment 1 of the present invention.
Figure 11:
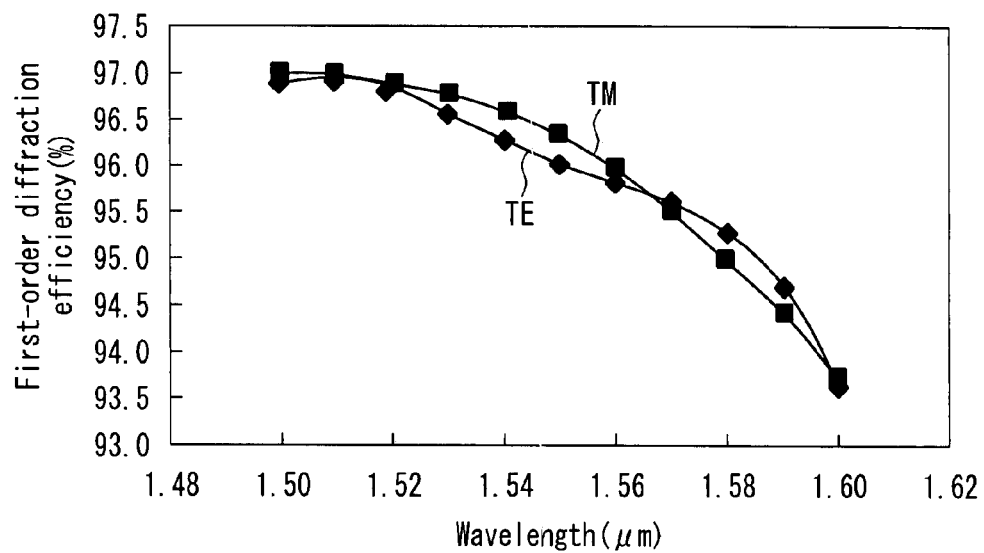
FIG. 11 is a graph showing the diffraction efficiency of first-order diffracted light versus the wavelength of incident light in Design Example 4 of Embodiment 1 of the present invention.
Figure 12:
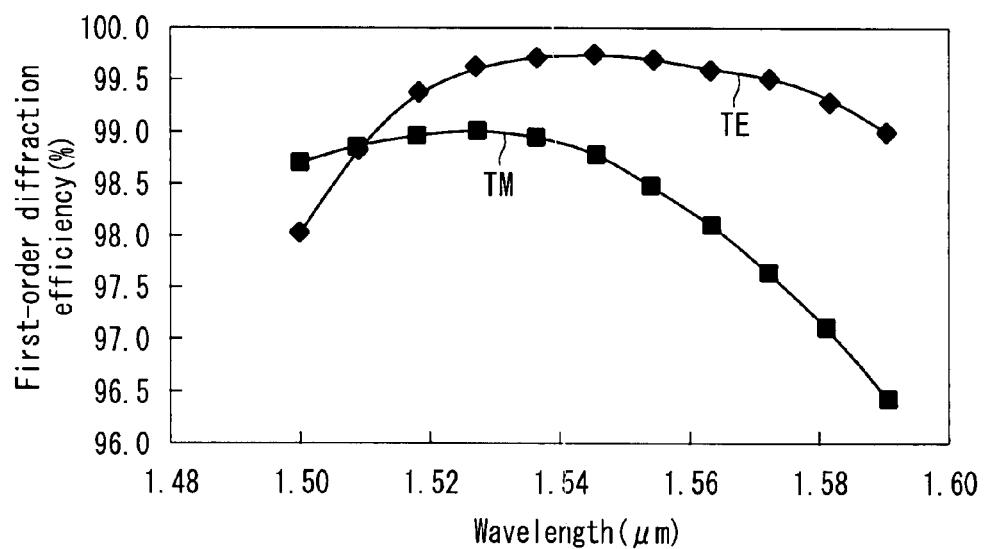
FIG. 12 is a graph showing the diffraction efficiency of first-order diffracted light versus the wavelength of incident light in Design Example 5 of Embodiment 1 of the present invention.
Figure 14:
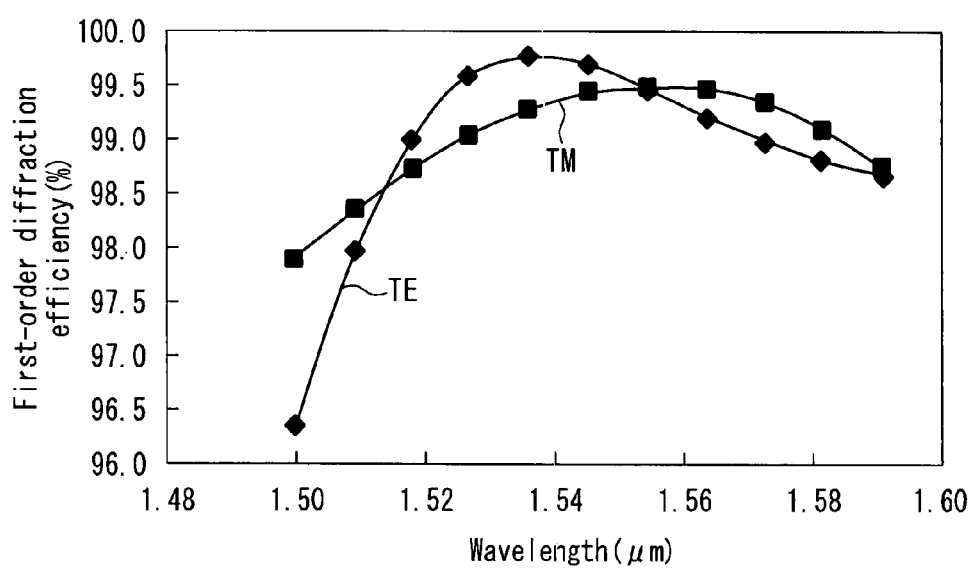
FIG. 14 is a graph showing the diffraction efficiency of first-order diffracted light versus the wavelength of incident light in Design Example 6 of Embodiment 1 of the present invention.

|  | Angle of incidence θ (Unit: °) | Refractive index of substrate $n_s$ | Refractive index of 1st layer $n_1$ | Refractive index of 2nd layer $n_2$ | Refractive index of 3rd layer $n_3$ | Thickness of 1st layer $d_1$ (Unit: μm) | Thickness of 2nd layer $d_2$ (Unit: μm) | Thickness of 3rd layer $d_3$ (Unit: μm) | Ridge width W (Unit: μm) | Characteristic diagram |
|---|---|---|---|---|---|---|---|---|---|---|
| Design Example 1 | 45 | 1.46 | 1.46 | 2.10 | 1.46 | 0.1674 | 1.0162 | 0.2054 | 0.5402 | FIGS. 3-8 |
| Design Example 2 | 50 | 1.45 | 1.45 | 2.18 | 1.45 | 0.2555 | 1.1130 | 0.2621 | 0.5803 | FIG. 9 |
| Design Example 3 | 50 | 1.45 | 1.45 | 2.14 | 1.45 | 0.3110 | 1.1004 | 0.2621 | 0.5803 | FIG. 10 |
| Design Example 4 | 50 | 1.45 | 1.45 | 2.10 | 1.45 | 0.4748 | 1.1198 | 0.2063 | 0.5893 | FIG. 11 |
| Design Example 5 | 50 | 1.45 | 1.45 | 2.10 | 1.45 | 0.2911 | 1.1452 | 0.2577 | 0.5888 | FIG. 12 |
| Design Example 6 | 50 | 1.45 | 1.45 | 2.18 | 1.45 | 0.2542 | 1.1329 | 0.2300 | 0.6092 | FIG. 14 |

TABLE 1-continued

Figure 16:
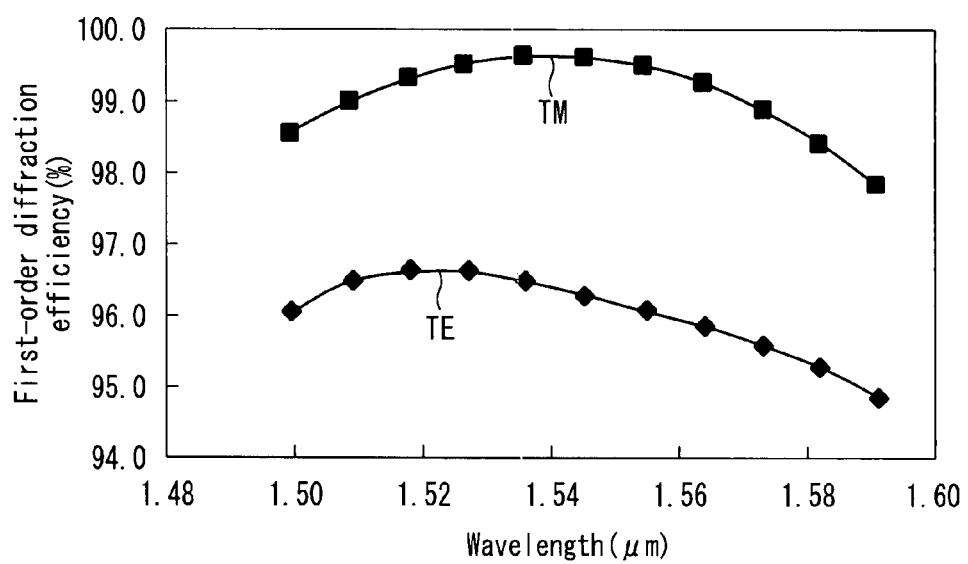
FIG. 16 is a graph showing the diffraction efficiency of first-order diffracted light versus the wavelength of incident light in Reference Example 1 of Embodiment 1 of the present invention.
Figure 17:
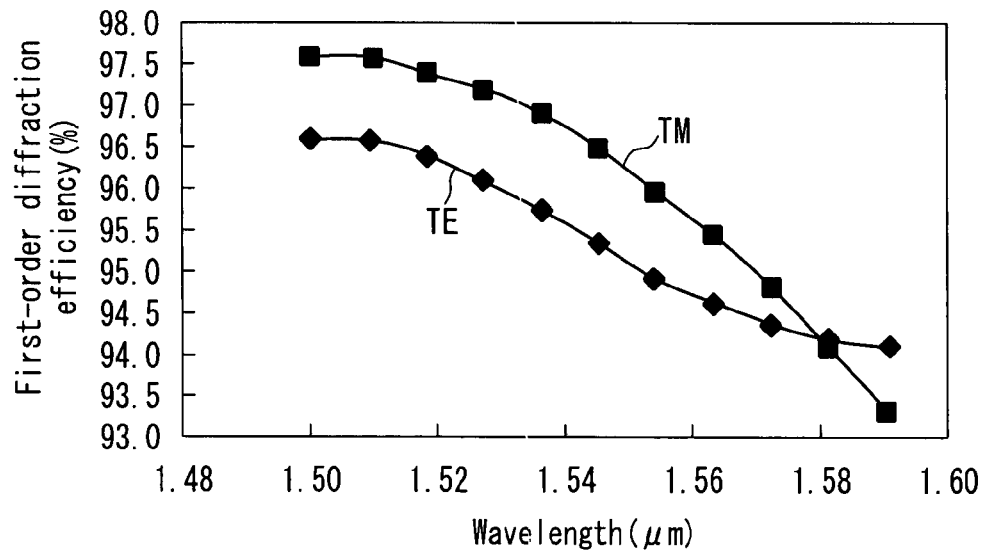
FIG. 17 is a graph showing the diffraction efficiency of first-order diffracted light versus the wavelength of incident light in Comparative Example 1 of Embodiment 1 of the present invention.
Figure 18:
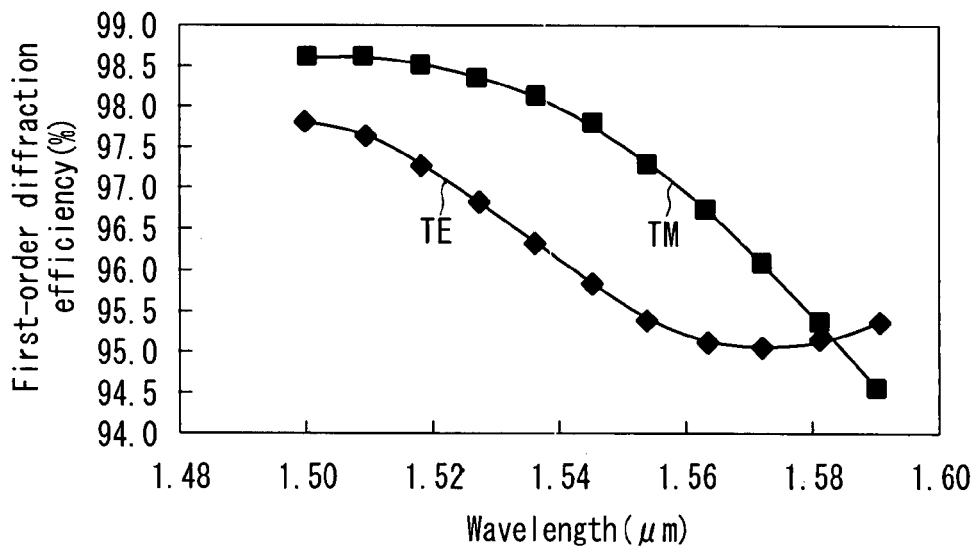
FIG. 18 is a graph showing the diffraction efficiency of first-order diffracted light versus the wavelength of incident light in Comparative Example 2 of Embodiment 1 of the present invention.

|  | Angle of incidence θ (Unit: °) | Refractive index of substrate $n_s$ | Refractive index of 1st layer $n_1$ | Refractive index of 2nd layer $n_2$ | Refractive index of 3rd layer $n_3$ | Thickness of 1st layer $d_1$ (Unit: μm) | Thickness of 2nd layer $d_2$ (Unit: μm) | Thickness of 3rd layer $d_3$ (Unit: μm) | Ridge width W (Unit: μm) | Characteristic diagram |
|---|---|---|---|---|---|---|---|---|---|---|
| Reference Example 1 | 50 | 1.45 | 1.45 | 2.18 | 1.45 | 0.2555 | 1.1130 | 0.2621 | 0.5803 | FIG. 16 |
| Comparative Example 1 | 50 | 1.45 | 1.45 | 2.10 | 1.45 | 0.0000 | 1.1501 | 0.3503 | 0.5799 | FIG. 17 |
| Comparative Example 2 | 50 | 1.45 | 1.45 | 2.10 | 1.45 | 0.0000 | 1.1788 | 0.2906 | 0.5846 | FIG. 18 |

Figure 3:
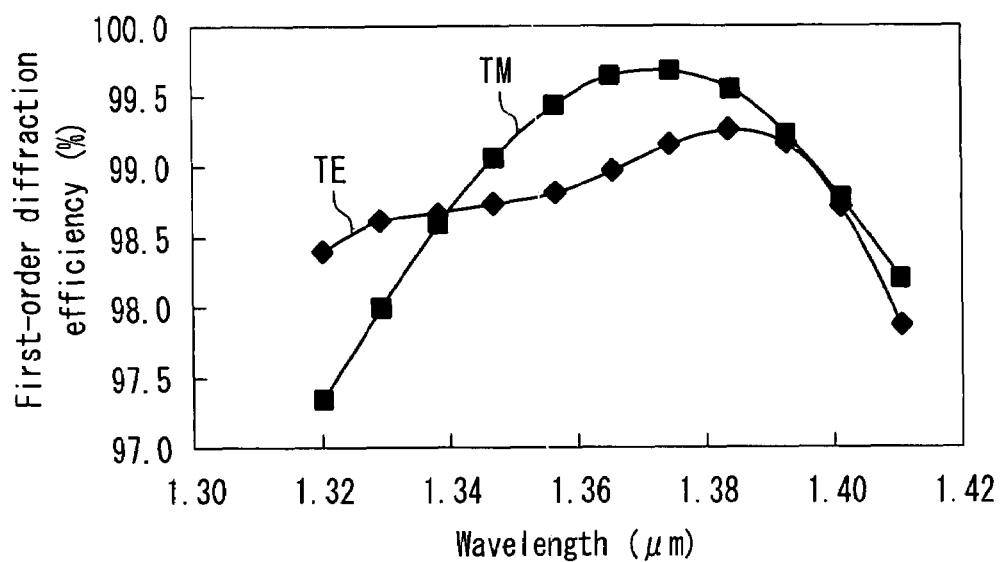
FIG. 3 is a graph showing the diffraction efficiency of first-order diffracted light versus the wavelength of incident light in Design Example 1 of Embodiment 1 of the present invention.

FIG. 3 shows the diffraction efficiency of first-order diffracted light versus the wavelength of incident light. As shown in FIG. 3, extremely good values with the maximum value thereof exceeding 99% are obtained for the diffraction efficiency of both TE-polarized light and TM-polarized light.

Moreover, FIGS. 4 to 8 show changes in diffraction efficiency obtained when varying each parameter individually starting from the values indicated above (Table 1). In FIGS. 4 to 8, FIG. A shows a case, in which TE-polarized light was used, and FIG. B shows a case, in which TM-polarized light was used. These diagrams were used to obtain tolerance ranges, as ranges where diffraction efficiency at a wavelength of 1.370 μm was not less than 95% both for TE-polarized light and for TM-polarized light. The results obtained are shown below.

FIG. 4:

In this case, in which the thickness $d_1$ of the first low refractive index layer 11 was individually varied, the tolerance range of thickness $d_1$ in the case of TE-polarized light was 0.025 μm to 0.340 μm. The tolerance range of thickness $d_1$ in case of TM-polarized light was wider than in the case of TE-polarized light.

FIG. 5:

In this case, in which the thickness $d_2$ of the high refractive index layer 12 was individually varied, the tolerance range of thickness $d_2$ in the case of TE-polarized light was 0.960 μm to 1.065 μm. The tolerance range of thickness $d_2$ in case of TM-polarized light was wider than in the case of TE-polarized light.

FIG. 6:

In this case, in which the thickness $d_3$ of the second low refractive index layer 13 was individually varied, the tolerance range of thickness $d_3$ in the case of TE-polarized light was 0.14 μm to 0.27 μm. The tolerance range of thickness $d_3$ in case of TM-polarized light was wider than in the case of TE-polarized light.

FIG. 7:

In this case, in which the width W of the ridges 20 was individually varied, the tolerance range of width W in the case of TE-polarized light was 0.50 μm to 0.58 μm. The tolerance range of width W in case of TM-polarized light was wider than in the case of TE-polarized light.

FIG. 8:

In this case, in which the refractive index $n_2$ of the high refractive index layer 12 was individually varied, the tolerance range of the refractive index $n_2$ in the case of TM-polarized light was 1.98 to 2.21. The tolerance range of the refractive index $n_2$ in case of TE-polarized light was wider than in the case of TM-polarized light.

Figure 4A:
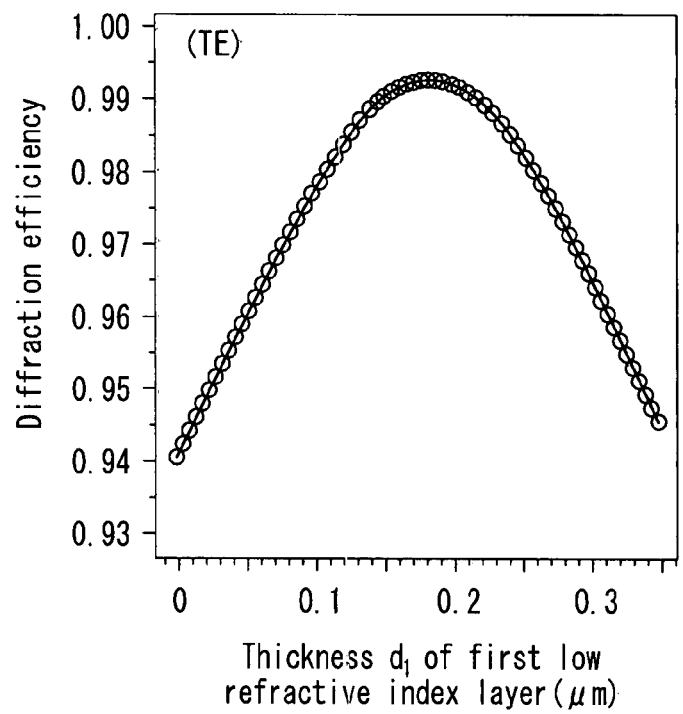
FIG. 4A illustrates TE-polarized light and FIG. 4B illustrates TM-polarized light.
Figure 4B:
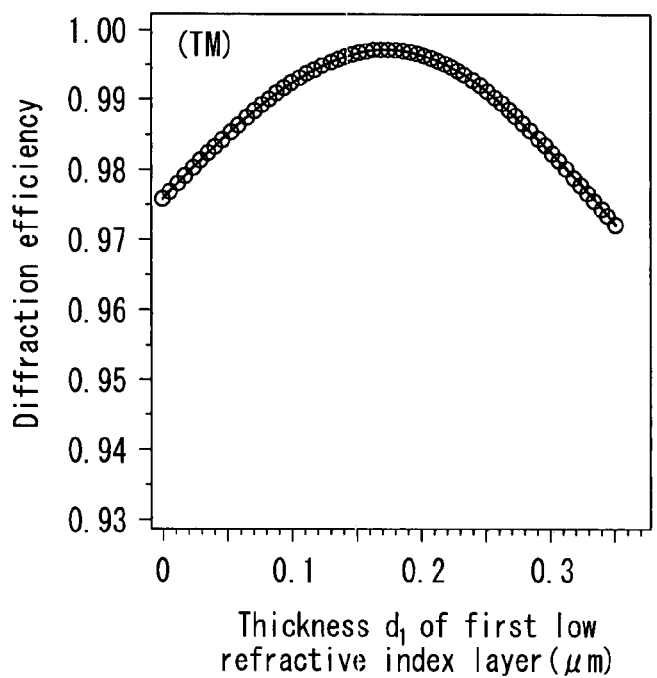
Figure 5A:
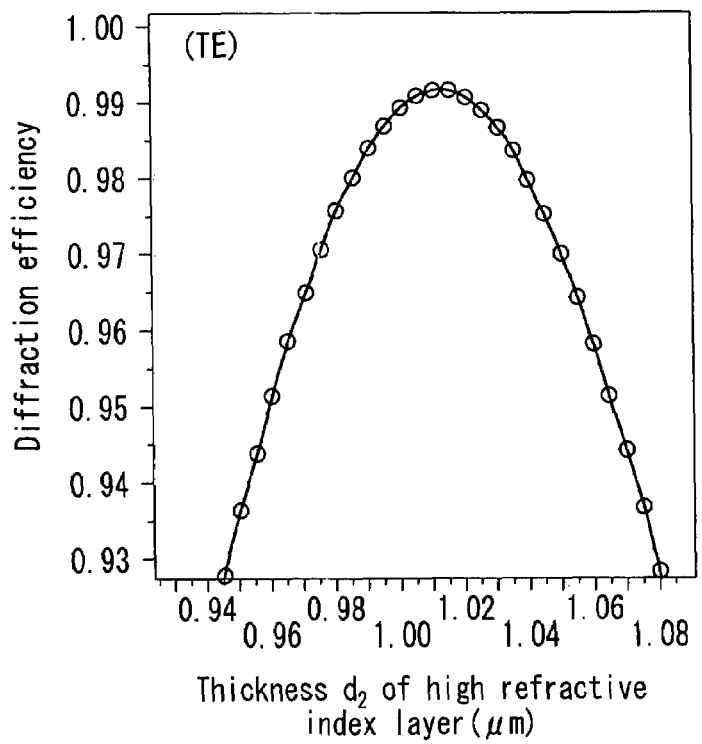
FIG. 5A illustrates TE-polarized light and FIG. 5B illustrates TM-polarized light.
Figure 5B:
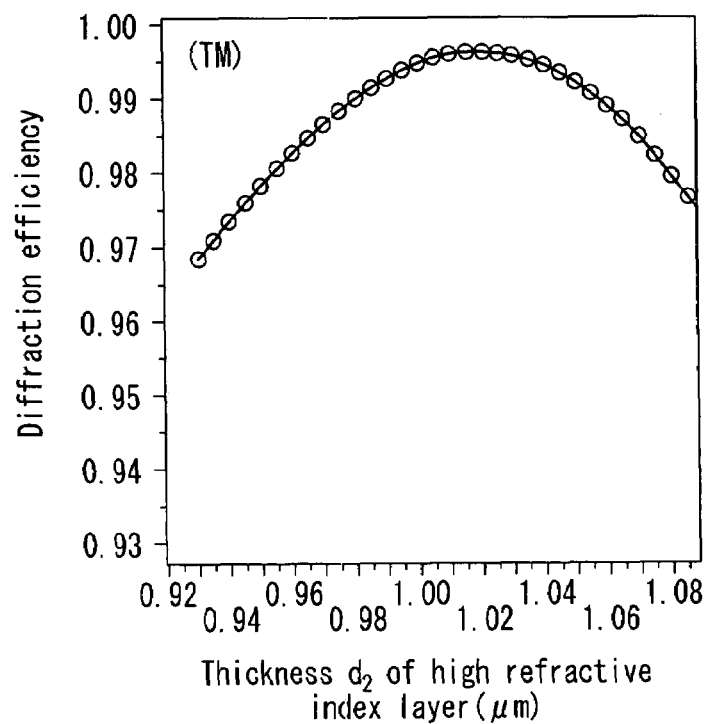
Figure 6A:
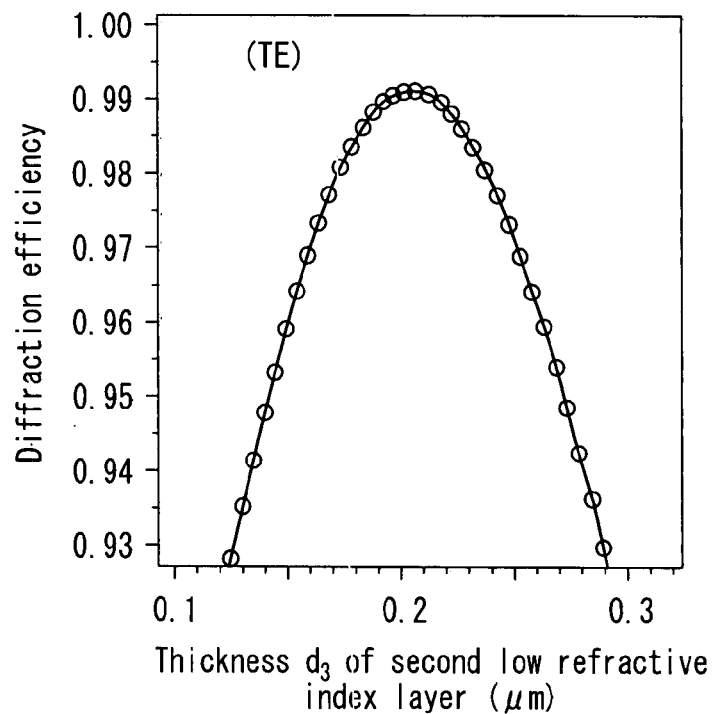
FIG. 6A illustrates TE-polarized light and FIG. 6B illustrates TM-polarized light.
Figure 6B:
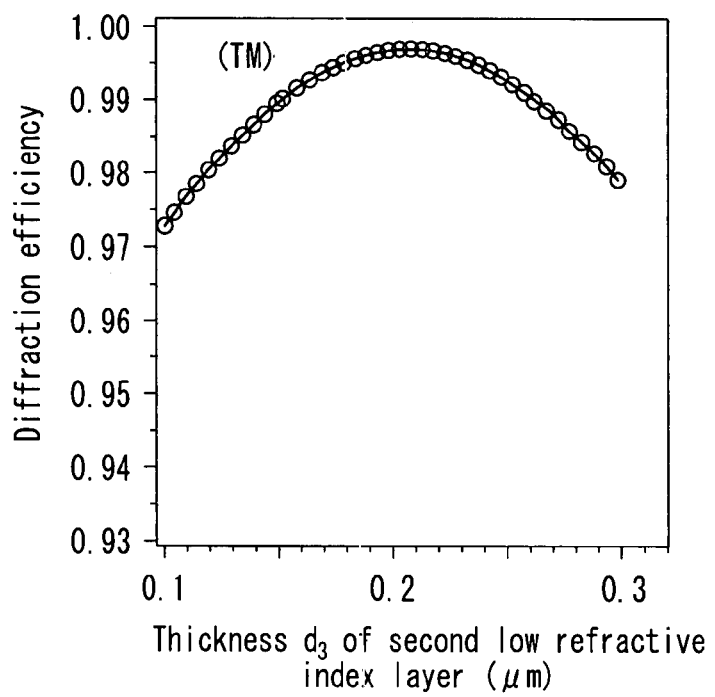
Figure 7A:
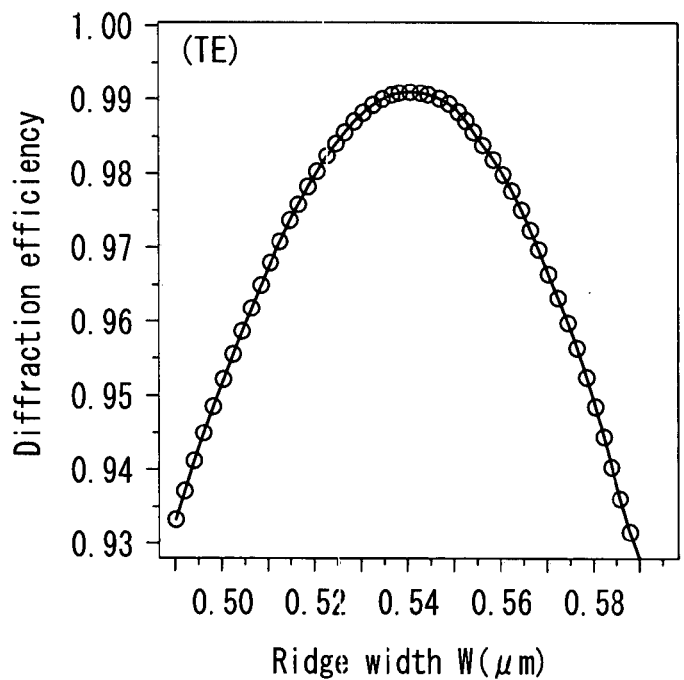
FIG. 7A illustrates TE-polarized light and FIG. 7B illustrates TM-polarized light.
Figure 7B:
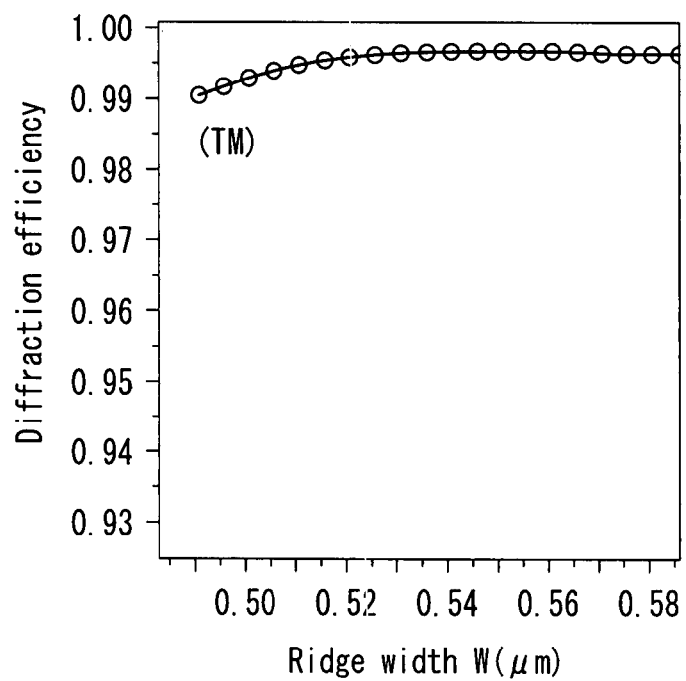
Figure 8A:
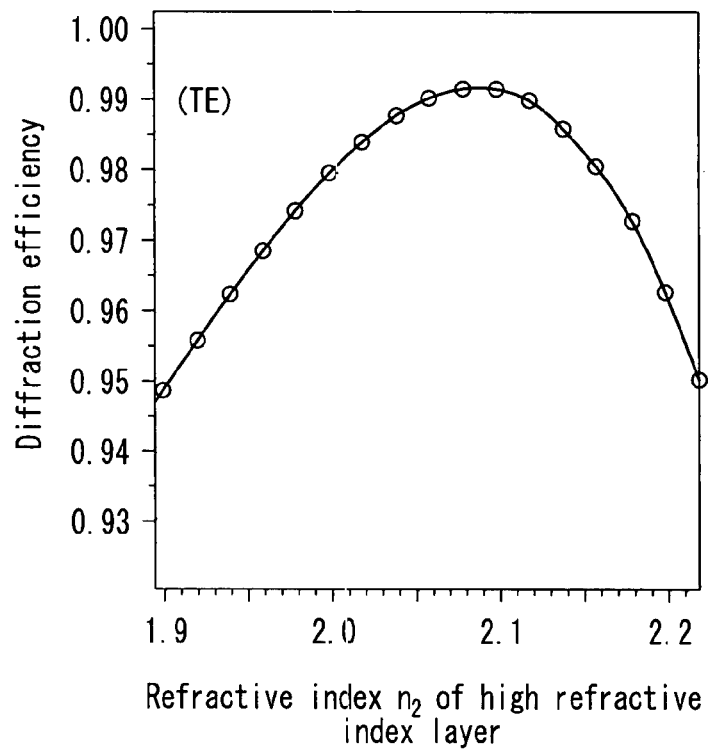
Figure 8B:
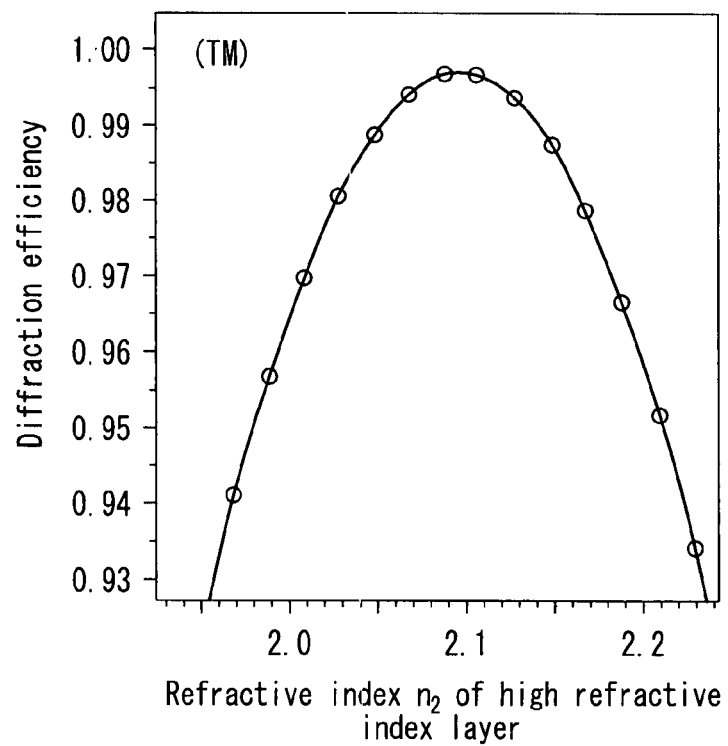

As shown in FIG. 4, the tolerance range of the thickness $d_1$ of the first low refractive index layer 11 is extremely wide. For this reason, conventionally, the depth of etching had to be controlled stingently, but in the present embodiment, there is no need to control the depth of etching strictly, and adjustment of the etching depth is easy to perform.

DESIGN EXAMPLE 2 to 5

Design examples 2 to 5 will be explained next.

The diffraction efficiency results of Design Examples 2 to 5 are shown in FIGS. 9 to 12, with the preset values being as indicated above (Table 1). In Design Examples 2 to 5, the angle of incidence θ onto the diffraction grating face was set to 50°, the periodicity p of the diffraction grating to 1 μm, the refractive index $n_1$ of the first low refractive index layer 11, the refractive index $n_3$ of the second low refractive index layer 13, and the refractive index n, the substrate 10 to 1.46, while the other parameters were optimized, including the thickness $d_1$ of the first low refractive index layer 11, the thickness $d_2$ of the high refractive index layer 12, the thickness $d_3$ of the second low refractive index layer 13, and the width W of the ridges 20. Moreover, in Design Examples 2 to 4, the refraction indices $n_2$ of the high refractive index layer 12 were set, respectively, to 2.18, 2.14, and 2.10 and each parameter was optimized so as to reduce PDL in the wavelength band range of from 1.500 μm to 1.600 μm. Moreover, in Design Example 5, the refraction index $n_2$ of the high refractive index layer 12 was set to 2.10 and each parameter was optimized with a view to increase, on the average, the diffraction efficiency in the wavelength band range of from 1.530 μm to 1.570 μm.

In FIGS. 9 to 11, the diffraction efficiency of TE-polarized light and TM-polarized light is practically the same, and PDL is extremely small. In addition, in FIG. 12, because the optimization was carried out with emphasis on diffraction efficiency, the diffraction efficiency of TE-polarized light is particularly excellent, and in the wavelength band range of from 1.51 μm to 1.59 μm the diffraction efficiency of TE-polarized light is 99% or higher.

It should be noted that although in the Design Examples 1 to 5 described above the periodicity p of the diffraction grating was 1 μm, even if the value of periodicity p of the diffraction grating is different, the same diffraction efficiency results are obtained if the width W of the ridges 20, the thickness $d_1$ of the first low refractive index layer 11, the thickness $d_2$ of the high refractive index layer 12, the thickness $d_3$ of the second low refractive index layer 13, and the value of incident light wavelength in a vacuum $\lambda_0$ are changed based on proportional calculation.

DESIGN EXAMPLE 6

Next, explanations are provided regarding Design Example 6, wherein a tapered shape is used as the shape of the cross section of the ridges perpendicular to their longitudinal direction.

Figure 13:
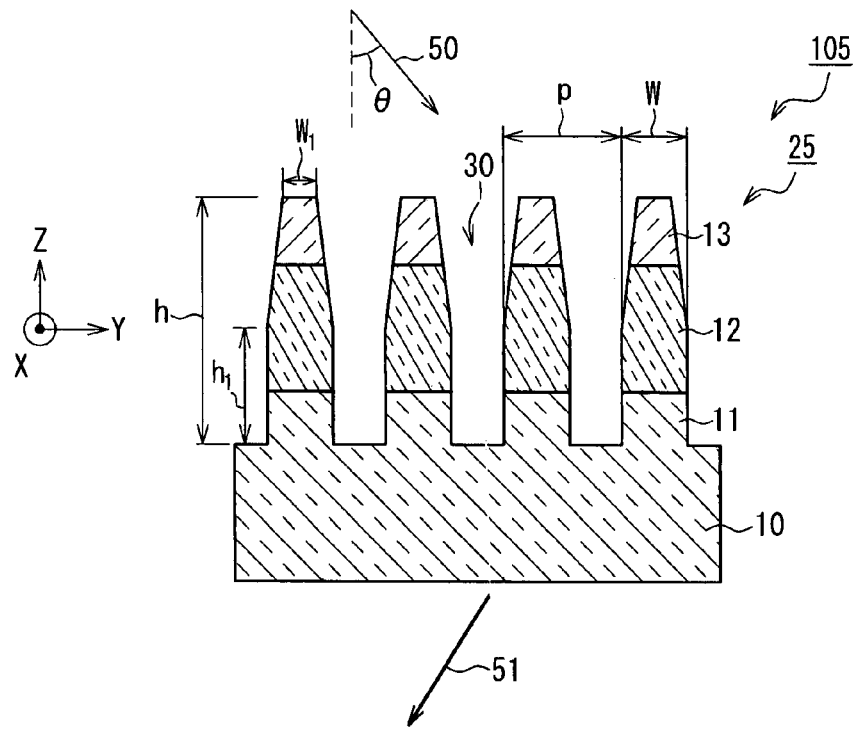
FIG. 13 is a cross-sectional view schematically illustrating a transmissive diffraction grating in Design Example 6 of Embodiment 1 of the present invention.

In a diffraction grating 105 shown in FIG. 13, the height of the ridges 25 is h, the width of the ridges 25 is a constant value W up to a height $h_1$ from the surface of the substrate 10, and, when the height from the surface of the substrate 10 becomes higher than $h_1$, the ridges 25 taper to be narrower in width, with the width at the tips of the ridges 25 being $W_1$. In Design Example 6, the angle of incidence θ upon the diffraction grating face, the periodicity p of the diffraction grating, and various refractive index conditions are the same as in Design Example 2, but the cross-sectional shape of the ridges 25 is a shape that satisfies the condition $h_1=h/2$, $W_1=0.8$ W.

Using the thickness $d_1$ of the first low refractive index layer 11, the thickness $d_2$ of the high refractive index layer 12, the thickness $d_3$ of the second low refractive index layer 13, and the width W of the ridges 25 as parameters, optimization was carried out with a view to minimize PDL in the wavelength band range of from 1.500 μm to 1.600 μm. The diffraction efficiency results of Design Example 6 are shown in FIG. 14, with the preset values being as indicated above (Table 1). In Design Example 6, both the diffraction efficiency and PDL were almost the same as in Design Example 2.

Figure 15:
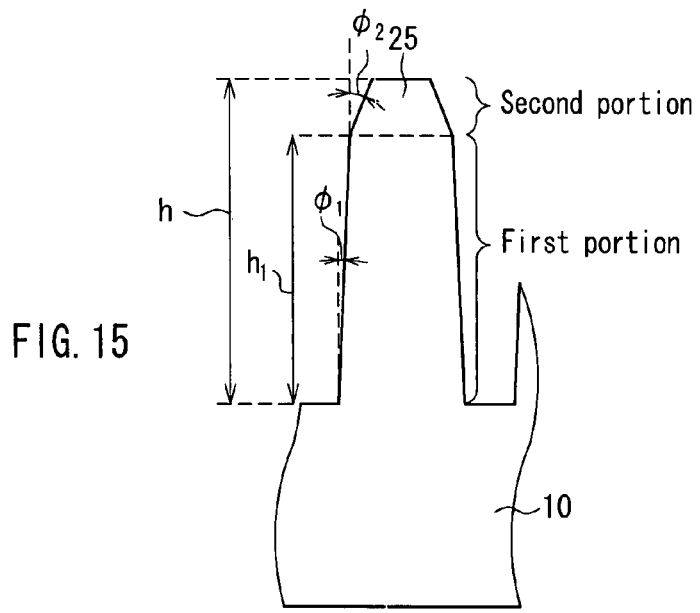
FIG. 15 is a cross-sectional view schematically illustrating another example of the transmissive diffraction grating in Design Example 6 of Embodiment 1 of the present invention.

In Design Example 6, the width of the ridges 25 in the portion (first portion) extending up to height $h_1$ (=h/2) from the surface of the substrate 10 was a constant value W and the width of the tips of the ridges 25 in the portion (second portion), in which their height from the surface of the substrate 10 was greater than $h_1$, was $W_1$ (=0.8 W). However, the same effects can be obtained even if the cross-sectional shape of the ridges 25 is defined as follows (see FIG. 15). In FIG. 15, $\phi_1$ is the angle between the normal to the surface of the substrate 10 and the side faces of the ridges 25 in the first portion, $\phi_2$ is the angle between the normal to the surface of the substrate 10 and the side face of the ridge 25 in the second portion, with $h_1$, $\phi_1$, and $\phi_2$ being within the ranges defined by the following formulas.

$$0.2\, h < h_1 < 0.7 h,$$

$$0° < \phi_1 < 5°,$$

$$\phi_1 < \phi_2 < 15°$$

REFERENCE EXAMPLE 1

Reference Example 1 will be explained next. Reference Example 1 describes a situation in which all the parameters are the same as in Design Example 2, and the tapered shape of Design Example 6 is used as the cross-sectional shape.

The diffraction efficiency results of Reference Example 1 are shown in FIG. 16, with the preset values being as indicated above (Table 1). As shown in FIG. 16, in Reference Example 1, the diffraction efficiency of TE-polarized light is considerably lower than in Design Example 2.

As illustrated above, Design Example 2, Design Example 6 and Reference Example 1 show that even when the cross-sectional shape of the ridges of the diffraction grating is supposed to be tapered, optimization based on the assumption of the ridges having a tapered shape for the cross-section makes it possible to obtain characteristics identical to those produced by ridges with a rectangular cross-section.

COMPARATIVE EXAMPLES 1 AND 2

Comparative examples 1 and 2 will be explained next.

Figure 36:
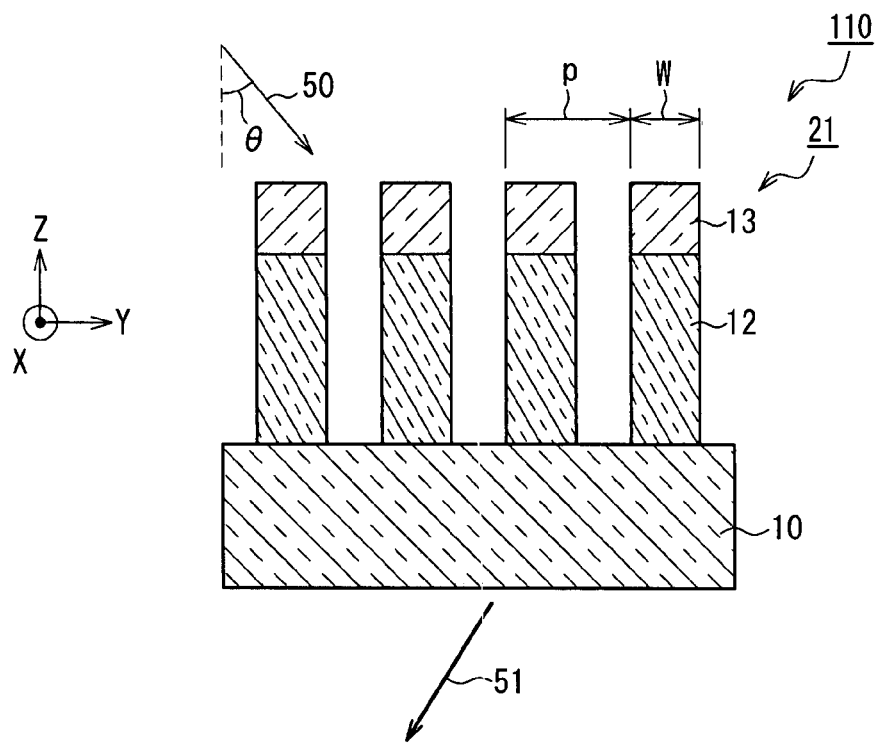
FIG. 36 is a cross-sectional view schematically illustrating a conventional transmissive diffraction grating.
Figure 37:
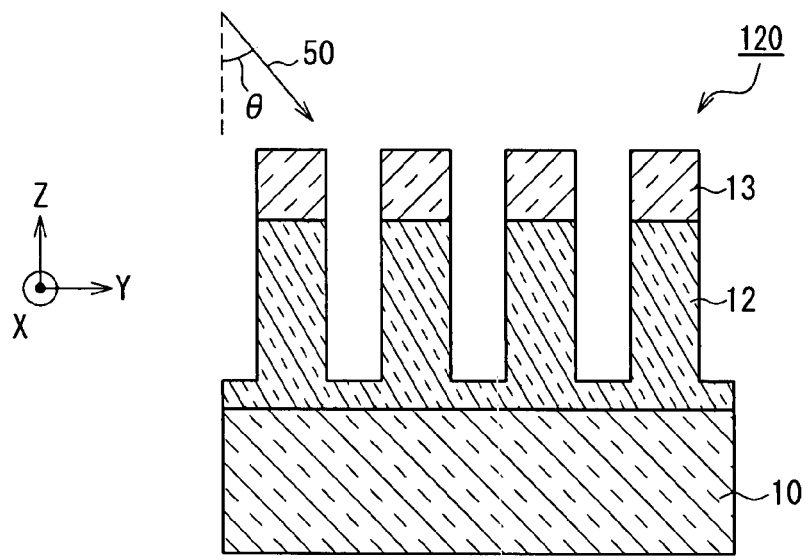
FIG. 37 is a cross-sectional view schematically illustrating another example of a conventional transmissive diffraction grating.

Comparative Examples 1 and 2, which were obtained by performing optimization in Design Examples 4 and 5 by setting the thickness of the first low refractive index layer 11 to 0, used the conventional diffraction grating shown in FIG. 36.

The diffraction efficiency results of Comparative Examples 1 and 2 are shown in FIGS. 17 and 18, with the preset values being as indicated above (Table 1). Because the first low refractive index layer 11 was not provided in Comparative Examples 1 and 2, even if the parameters are optimized, the diffraction efficiency and PDL characteristics were relatively inferior to Design Examples 4 and 5.

Embodiment 2

When the ridges 20 are etched in accordance with the above-described processes, as shown in FIG. 1, the width W of the ridges 20 preferably is maintained constant, which may be technologically complicated. Namely, setting the condition such that etching can be performed easily in many cases often leads to cases in which the width W of the ridges 20 increases as the location becomes closer to the substrate 10, and the shape of the cross-section of the ridges 20 perpendicular to their longitudinal direction is either "trapezoidal" or "bell-shaped". In such a case, the shape of the ridges 20 will deviate from the design values, and, therefore, diffraction efficiency, PDL, and other characteristics will change.

Incidentally, according to research conducted by the present inventors, factors exerting considerable influence on the characteristics of the diffraction grating include the thickness $d_2$ of the high refractive index layer 12 and the cross-sectional area S of the high refractive index layer 12. Here, the cross-sectional area S of the high refractive index layer 12 refers to the cross-sectional area of a cross-section for a single ridge 20 perpendicular to the longitudinal direction of said ridge 20. As will be described below, the cross-sectional area S of the high refractive index layer 12 preferably is in the range of $0.75\, p^2 k_1 \theta^2/(n_2-1) < S < 1.20\, p^2 k_1 \theta^2/(n_2-1)$, where, θ is the angle of incidence onto the diffraction grating face, expressed in radian units, and the constant $k_1$ is 1.1.

In addition, the thickness $d_2$ of the high refractive index layer 12 preferably is in the range of $0.70\, p k_2 \theta n_2/(n_2-1) < d_2 < 1.30\, p k_2 \theta n_2/(n_2-1)$, where, the constant $k_2$ is 0.69.

Changes in characteristics due to the cross-sectional shape (rectangular, tapered, bell-shaped) of the ridges 20 are small, and if the thickness $d_2$ and cross-sectional area S of the high refractive index layer 12 remain the same, similar characteristics will be obtained. Accordingly, this makes it possible to conduct design while assuming that an easy-to-form cross-sectional shape will be used.

DESIGN EXAMPLE 7

Figure 19A:
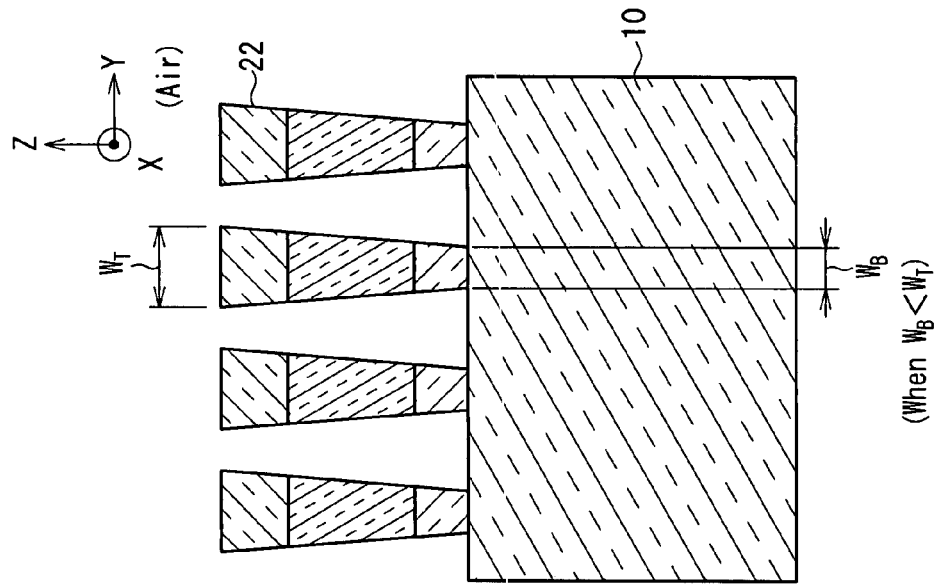
FIG. 19 shows cross-sectional views schematically illustrating a transmissive diffraction grating in Design Example 7 of Embodiment 2 of the present invention.
Figure 19B:
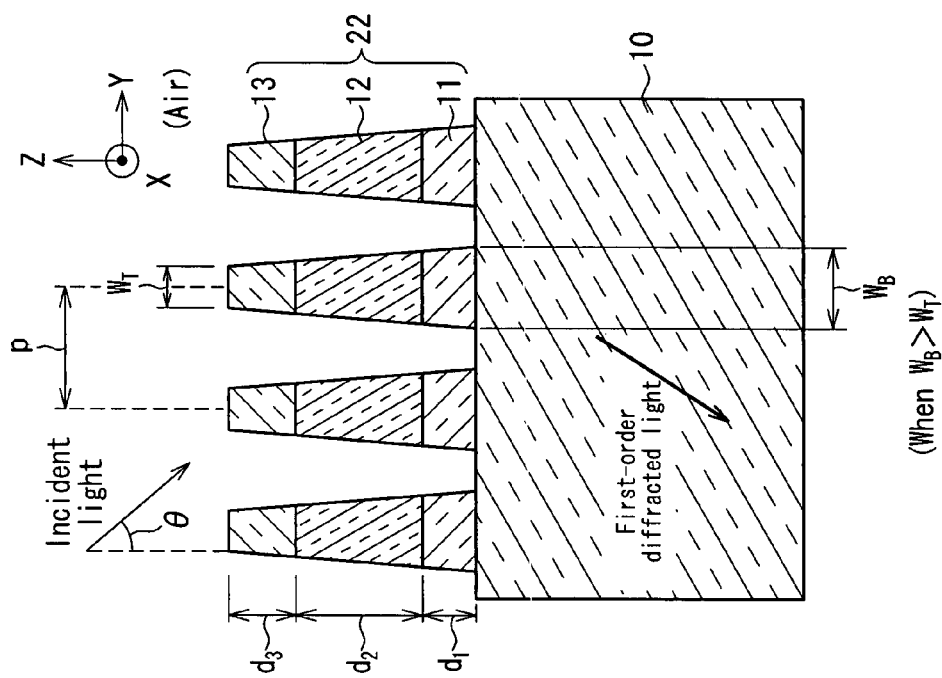

Design Example 7 is an example of a design, in which the entire cross-section of a ridge 22 is tapered (see FIGS. 19A and 19B).

In Design Example 7, the angle of incidence θ onto the diffraction grating face was set to 49.85°, the periodicity p of the diffraction grating to 1 μm, the refractive index $n_1$ of the first low refractive index layer 11 and the refractive index $n_3$ of the second low refractive index layer 13 to 1.4584, the refractive index $n_s$ of the substrate 10 to 1.45, and the refractive index $n_2$ of the high refractive index layer 12 to 2.2263, while the other parameters were optimized, including the thickness $d_1$ of the first low refractive index layer 11, the thickness $d_2$ of the high refractive index layer 12, the thickness $d_3$ of the second low refractive index layer 13, and the average width W of the ridges 22. The optimization of each parameter was conducted with a view to increase, on the average, the diffraction efficiency in the wavelength band range of from 1.500 μm to 1.600 μm.

As shown in FIG. 19, the cross-sectional shape of ridges 22 is a tapered shape, whose width changes in a linear manner from the surface of the substrate 10 towards the tip of the ridge 22. The results of the optimization, which was conducted by designating the width of the ridges 22 at the surface of the substrate 10 as $W_B$ and the width of the ridges at their tips as $W_T$, are listed below (Table 2). The average width W of the ridge 22 is an average of $W_B$ and $W_T$. It should be noted that the term "average value of diffraction efficiency", as used hereinbelow (Table 2), is an average of first-order diffraction efficiencies (both TE-polarized light and TM-polarized light) at wavelengths of 1.500 μm, 1.510 μm, 1.520 μm, . . . , 1.590 μm, and 1.600 μm.

the diffraction grating to 1 μm, the refractive index $n_1$ of the first low refractive index layer 11 and the refractive index $n_3$ of the second low refractive index layer 13 to 1.4584, the refractive index $n_s$ of the substrate 10 to 1.45, and the refractive index $n_2$ of the high refractive index layer 12 to 2.2263, while the other parameters were optimized, including the thickness $d_1$ of the first low refractive index layer 11, the thickness $d_2$ of the high refractive index layer 12, the thickness $d_3$ of the second low refractive index layer 13, and the average width W of the ridges 23. The optimization of each parameter was conducted with a view to increase, on the average, the diffraction Efficiency in the wavelength band range of from 1.500 μm to 1.600 μm.

As shown in FIG. 21, the cross-sectional shape of the ridges 23 is either a barrel-like shape or a spool-like shape,

TABLE 2

Figure 20:
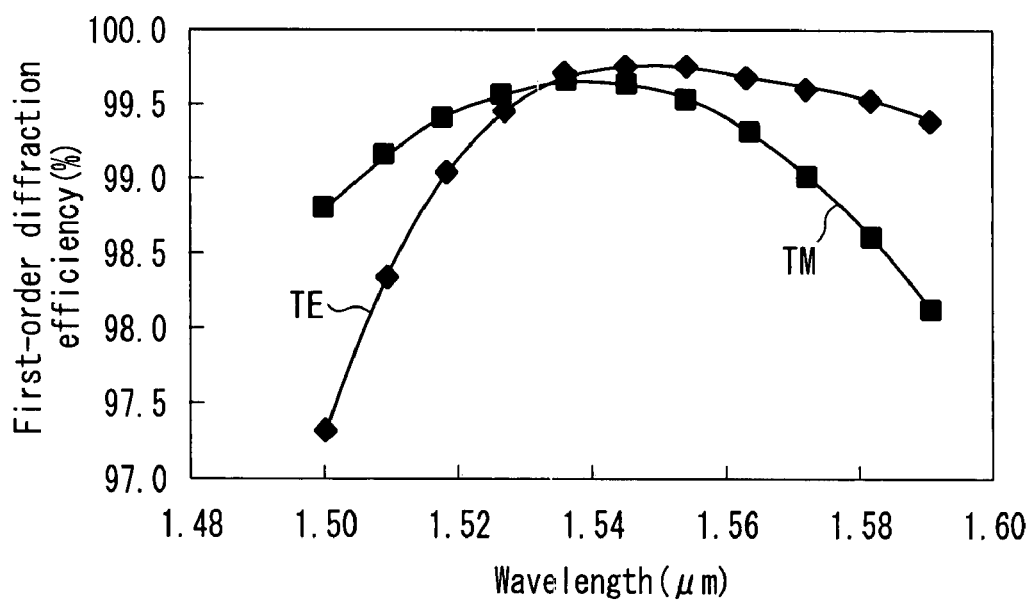
FIG. 20 is a graph showing the diffraction efficiency of first-order diffracted light versus the wavelength of incident light in Design Example 7-6 of Embodiment 2 of the present invention.

|  | Thickness of 1st layer $d_1$ (Unit: μm) | Thickness of 2nd layer $d_2$ (Unit: μm) | Thickness of 3rd layer $d_3$ (Unit: μm) | Average ridge width W (Unit: μm) | Ridge width at substrate $W_B$ (Unit: μm) | Ridge width at tip $W_T$ (Unit: μm) | Average value of diffraction efficiency | Characteristic diagram |
|---|---|---|---|---|---|---|---|---|
| Design Example 7-1 | 0.2447 | 1.0958 | 0.2585 | 0.5817 | 0.8 w | 1.2 w | 0.9841 | — |
| Design Example 7-2 | 0.2207 | 1.0900 | 0.2722 | 0.5837 | 0.9 w | 1.1 w | 0.9860 | — |
| Design Example 7-3 | 0.2299 | 1.0894 | 0.2665 | 0.5683 | 1.0 w | 1.0 w | 0.9876 | — |
| Design Example 7-4 | 0.1958 | 1.1012 | 0.2694 | 0.5796 | 1.1 w | 0.9 w | 0.9892 | — |
| Design Example 7-5 | 0.1958 | 1.1072 | 0.2694 | 0.5780 | 1.2 w | 0.8 w | 0.9909 | — |
| Design Example 7-6 | 0.2207 | 1.0926 | 0.2974 | 0.5863 | 1.3 w | 0.7 w | 0.9912 | FIG. 20 |
| Design Example 7-7 | 0.2114 | 1.1109 | 0.2974 | 0.5780 | 1.4 w | 0.6 w | 0.9900 | — |

As can be seen from the above (Table 2), the diffraction efficiency is highest not when the cross-sectional shape of the ridges 22 is rectangular ($W_B$=1.0 W, $W_T$=1.0 W) (Design Example 7-3), but when it is an outwardly converging tapered shape ($W_B$=1.3 W, $W_T$=0.7 W) (Design Example 7-6). The characteristics obtained in this case are shown in FIG. 20.

DESIGN EXAMPLE 8

Figure 21B:
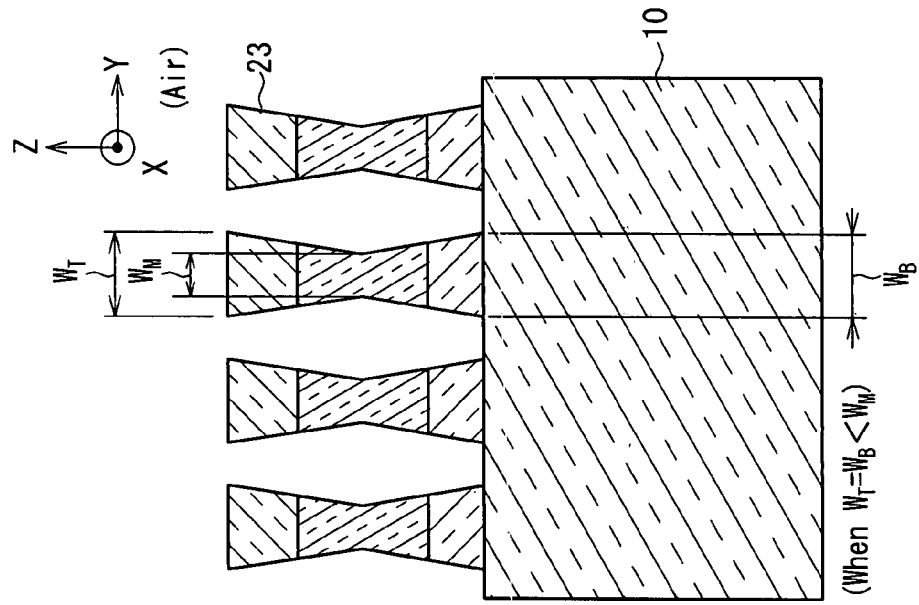
FIG. 21 shows cross-sectional views schematically illustrating a transmissive diffraction grating in Design Example 8 of Embodiment 2 of the present invention.
Figure 21A:
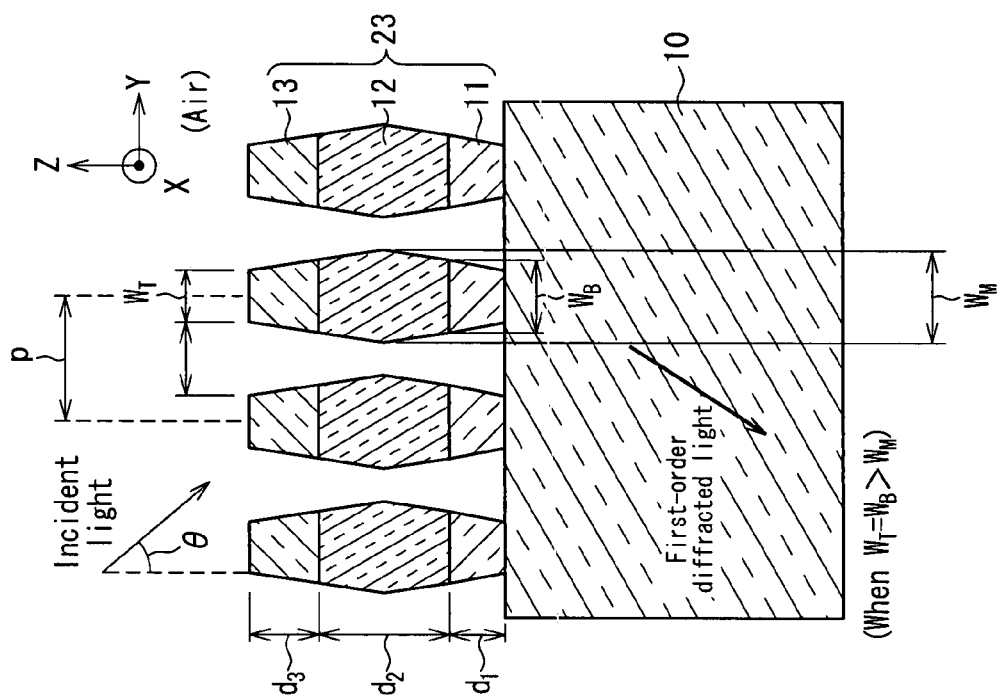

Design Example 8 is an example of a design, in which the cross-section of ridges 23 is barrel-shaped (see FIG. 21A) or spool-shaped (see FIG. 21B).

In Design Example 8, the angle of incidence θ onto the diffraction grating face was set to 49.85°, the periodicity p of wherein the central width of the ridge 23 is $W_M$, and the width $W_B$ of the ridge 23 at the surface of the substrate 10 is the same as the width $W_T$ of the ridge 23 at the tip of the ridge. The average width W of the ridges 23 is an average of $W_B$ and $W_M$. The results of the optimization are listed below (Table 3). It should be noted that the term "average value of diffraction efficiency", as used hereinbelow (Table 3), is an average of first-order diffraction efficiencies (both TE-polarized light and TM-polarized light) at wavelengths of 1.500 μm, 1.510 μm, 1.520 μm, . . . , 1.590 μm, and 1.600 μm. Moreover, Design Example 8-3 below (Table 3) is the same as Design Example 7-3 above (Table 2).

TABLE 3

Figure 22:
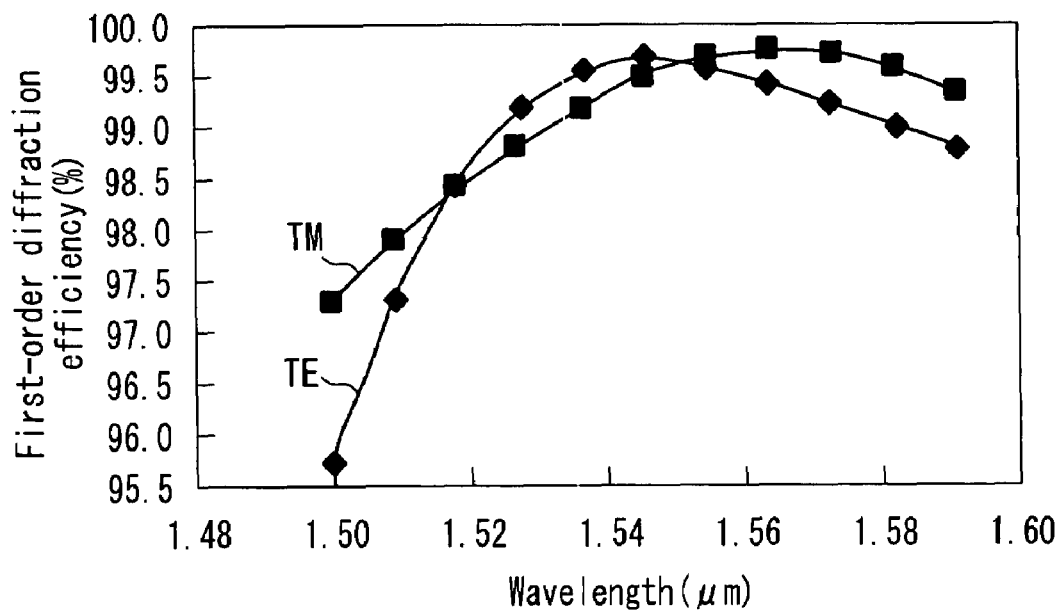
FIG. 22 is a graph showing the diffraction efficiency of first-order diffracted light versus the wavelength of incident light in Design Example 8-4 of Embodiment 2 of the present invention.

|  | Thickness of 1st layer $d_1$ (Unit: μm) | Thickness of 2nd layer $d_2$ (Unit: μm) | Thickness of 3rd layer $d_3$ (Unit: μm) | Average ridge width W (Unit: μm) | Ridge width at substrate $W_B$ (—) | Width at mid-point of ridge $W_M$ (—) | Average value of diffraction efficiency | Characteristic diagram |
|---|---|---|---|---|---|---|---|---|
| Design Example 8-1 | 0.2683 | 1.0821 | 0.2687 | 0.6109 | 1.2 w | 0.8 w | 0.9830 | — |
| Design Example 8-2 | 0.1958 | 1.0900 | 0.2694 | 0.5969 | 1.1 w | 0.9 w | 0.9850 | — |
| Design Example 8-3 | 0.2299 | 1.0894 | 0.2665 | 0.5683 | 1.0 w | 1.0 w | 0.9876 | — |
| Design Example 8-4 | 0.2263 | 1.0907 | 0.2694 | 0.5738 | 0.9 w | 1.1 w | 0.9884 | FIG. 22 |
| Design Example 8-5 | 0.2447 | 1.0773 | 0.2790 | 0.5817 | 0.8 w | 1.2 w | 0.9813 | — |

As can be seen from the above (Table 3), the diffraction efficiency is highest when the cross-sectional shape of the ridges 23 is barrel-like ($W_B$=0.9 W, $W_M$=1.1 W) (Design Example 8-4). The characteristics obtained in this case are shown in FIG. 22.

DESIGN EXAMPLES 9 to 18

Figure 23A:
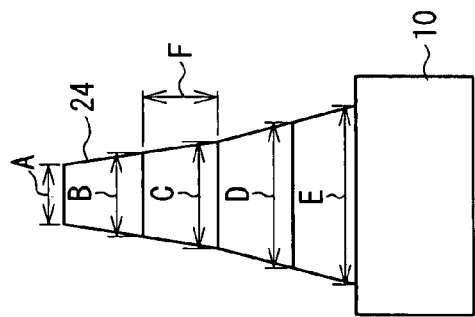
FIG. 23 shows cross-sectional views schematically illustrating a transmissive diffraction grating in Design Examples 9 to 18 of Embodiment 2 of the present invention.
Figure 23B:
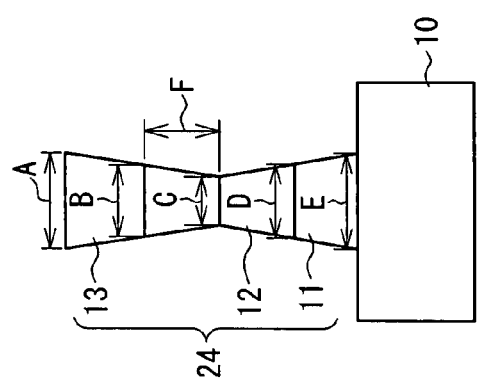
Figure 23C:
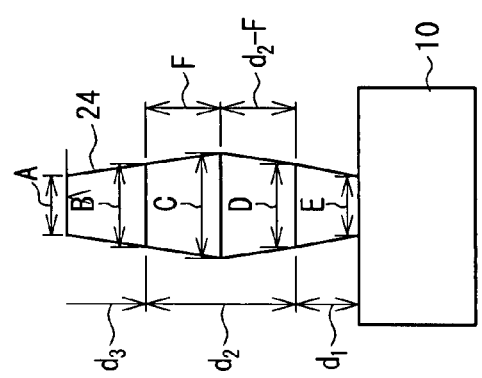
Figure 23D:
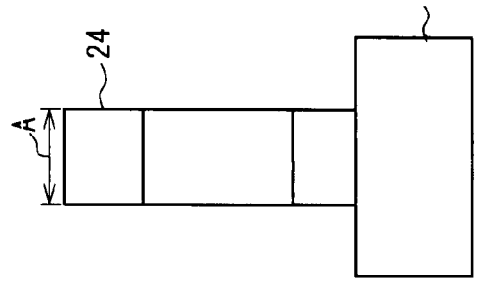
Figure 23E:
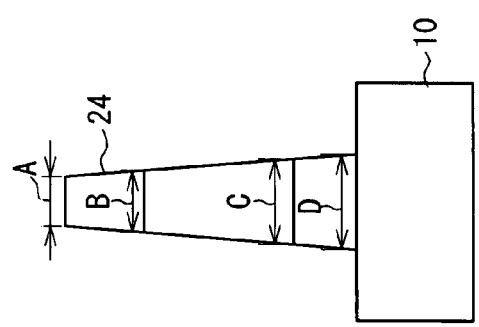

Design Examples 9 to 18 are examples of a design, in which the cross-section of ridges 24 is barrel-shaped (see FIG. 23A), spool-shaped (see FIG. 23B), broken-type (see FIG. 23C), tapered (FIG. 23D), or rectangular (see FIG. 23E).

For the tapered cross-sectional shape shown in FIG. 23D, the angle of incidence θ onto the diffraction grating face was set to 50°, the periodicity p of the diffraction grating to 1 μm, the refractive index $n_1$ of the first low refractive index layer 11, the refractive index $n_3$ of the second low refractive index layer 13, and the refractive index $n_s$ of the substrate 10 to 1.45, and the refractive index $n_2$ of the high refractive index layer 12 to 2.20, while the other parameters were optimized, including the thickness $d_1$ of the first low refractive index layer 11, the thickness $d_2$ of the high refractive index layer 12, the thickness $d_3$ of the second low refractive index layer 13, the width B of the high refractive index layer 12 at its boundary with the second low refractive index layer 13, and its width C at its boundary with the first low refractive index layer 11. The results of the optimization are listed in Design Example 11 below (Table 4). The values of the width E of the ridges 24 at the surface of the substrate 10 and width A of the ridges 24 at the tips thereof are determined in a dependent manner. The optimization of each parameter was carried out by obtaining first-order diffraction efficiencies (both TE-polarized light and TM-polarized light) for eleven wavelengths (interval: 0.01 μm) in the wavelength band range of from 1.500 μm to 1.600 μm and performing optimization with a view to increase their average value (referred to as "average diffraction efficiency" below) as much as possible.

TABLE 4

|  | Angle of incidence θ (°) | Refractive index of substrate | Refractive index of first low refractive index layer | Refractive index of high refractive index layer | Refractive index of second low refractive index layer | Height $d_1$ of first low refractive index layer (μm) | Height $d_2$ of high refractive index layer (μm) | Height $d_3$ of second low refractive index layer (μm) |
|---|---|---|---|---|---|---|---|---|
| Design Example 9 | 50 | 1.45 | 1.45 | 2.20 | 1.45 | 0.1618 | 1.1139 | 0.2682 |
| Design Example 10 | 50 | 1.45 | 1.45 | 2.20 | 1.45 | 0.1618 | 1.1139 | 0.2682 |
| Design Example 11 | 50 | 1.45 | 1.45 | 2.20 | 1.45 | 0.1618 | 1.1139 | 0.2682 |
| Design Example 12 | 50 | 1.45 | 1.45 | 2.20 | 1.45 | 0.1618 | 1.1139 | 0.2682 |
| Design Example 13 | 50 | 1.45 | 1.45 | 2.20 | 1.45 | 0.1618 | 1.1139 | 0.2682 |
| Design Example 14 | 50 | 1.45 | 1.45 | 2.20 | 1.45 | 0.1618 | 1.1139 | 0.2682 |
| Design Example 15 | 50 | 1.45 | 1.45 | 2.20 | 1.45 | 0.1618 | 1.1139 | 0.2682 |
| Design Example 16 | 50 | 1.45 | 1.45 | 2.20 | 1.45 | 0.1618 | 1.1139 | 0.2682 |
| Design Example 17 | 50 | 1.45 | 1.45 | 2.20 | 1.45 | 0.1618 | 1.1139 | 0.2682 |
| Design Example 18 | 50 | 1.45 | 1.45 | 2.20 | 1.45 | 0.1618 | 1.1139 | 0.2682 |

|  | A (μm) | B (μm) | C (μm) | D (μm) | E (μm) | F (μm) | Cross-sectional area S of high refractive index layer (μm²) | Wavelength band (μm) | Average diffraction efficiency |
|---|---|---|---|---|---|---|---|---|---|
| Design Example 9 | 0.5825 | — | — | — | — | — | 0.6488 | 1.50-1.60 | 0.9820 |
| Design Example 10 | 0.4125 | 0.4500 | 0.5790 | — | 0.7906 | — | 0.6488 | 1.50-1.60 | 0.9807 |
| Design Example 11 | 0.4945 | 0.5135 | 0.5790 | — | 0.6965 | — | 0.6488 | 1.50-1.60 | 0.9850 |
| Design Example 12 | 0.6813 | 0.6583 | 0.5790 | — | 0.4820 | — | 0.6488 | 1.50-1.60 | 0.9769 |
| Design Example 13 | 0.7633 | 0.7218 | 0.5790 | — | 0.3879 | — | 0.6488 | 1.50-1.60 | 0.9679 |
| Design Example 14 | 0.4757 | 0.5149 | 0.6500 | 0.5149 | 0.4498 | 0.55695 | 0.6488 | 1.50-1.60 | 0.9783 |
| Design Example 15 | 0.7128 | 0.6649 | 0.5000 | 0.6649 | 0.7443 | 0.55695 | 0.6488 | 1.50-1.60 | 0.9725 |
| Design Example 16 | 0.3013 | 0.3798 | 0.6500 | 0.6500 | 0.6500 | 0.55695 | 0.6488 | 1.50-1.60 | 0.9651 |
| Design Example 17 | 0.5000 | 0.5000 | 0.5000 | 0.8298 | 0.9886 | 0.55695 | 0.6488 | 1.50-1.60 | 0.9731 |
| Design Example 18 | 0.4709 | 0.5000 | 0.6000 | 0.6298 | 0.6442 | 0.55695 | 0.6488 | 1.50-1.60 | 0.9851 |

In Design Example 9, Design Example 10, and Design Examples 12 through 18 shown above (Table 4), the design values of Design Example 11 were used as a reference and the cross-sectional shape of the ridges 24 was varied via parameters A, B, C, D, E, and F shown in FIG. 23 without changing the thickness $d_1$ of the first low refractive index layer 11, thickness $d_2$ of the high refractive index layer 12, and thickness $d_3$ of the second low refractive index layer 13. Even though the shape of the ridges 24 changed, the cross-sectional area S of the high refractive index layer 12 remained the same as in the case of Design Example 11. It should be noted that, in case of FIGS. 23A, 23B and 23C, the values of parameters A and E are determined uniquely if parameters B, C, D, and F are determined.

Design Example 9 is an example of a design, in which the cross-sectional shape of the ridges 24 is rectangular.

Design Example 10 is an example of a design, in which the cross-sectional shape of the ridges 24 is an outwardly converging tapered shape with a more acute taper angle than in the case of Design Example 11.

Design Example 11 is a basic design example based on optimization conducted for a case in which the cross-sectional shape of the ridges 24 is an outwardly converging tapered shape.

Design Example 12 is an example of a design, in which the cross-sectional shape of the ridges 24 is an inwardly converging tapered shape, with the taper angle being the opposite of that of Design Example 11.

Design Example 13 is an example of a design, in which the cross-sectional shape of the ridges 24 is an inwardly converging tapered shape, with a more acute taper angle than in the case of Design Example 12.

Design Example 14 is an example of a design in which the cross-sectional shape of the ridges 24 is a barrel-like shape bulging in the middle.

Design Example 15 is an example of a design, in which the cross-sectional shape of the ridges 24 is a spool-like shape rendered narrower in the middle.

Design Example 16 is an example of a design in which the cross-sectional shape of the ridges 24 is a shape, wherein the tip portion has an outwardly converging tapered shape and the portion adjacent the substrate 10 has a rectangular shape.

Design Example 17 is an example of a design in which the cross-sectional shape of the ridges 24 is a shape, wherein the tip portion has a rectangular shape and the portion adjacent the substrate 10 has an outwardly converging tapered shape.

Design Example 18 is an example of a design in which the cross-sectional shape of the ridges 24 is an outwardly converging tapered shape whose taper angle changes midway through the ridge.

The average diffraction efficiencies of the respective design examples are also listed above (Table 4). Although the average diffraction efficiency had the highest value in Design Example 18 (0.9851) and a value (0.9850) close to the highest value in Design Example 11, i.e. the basic design example, it did not decrease very much even if the cross-sectional shape of the ridges 24 was a different shape. Thus, it was found that so long as the cross-sectional area S of the high refractive index layer 12 remains a constant value, the influence exerted by the shape of the ridges 24 on the diffraction efficiency is small.

COMPARATIVE EXAMPLES 3 to 16

Comparative Examples 3 to 16 were obtained by using the design values of Design Example 11 as a reference and varying the width of the ridges. The cross-sectional shape of the ridges was an outwardly converging tapered shape and the taper angle was the same as in case of Design Example 11. The difference from the ridge widths of Design Example 11 is designated as ΔW. The preset values of Comparative Examples 3-16 are shown below (Table 5).

TABLE 5

| | ΔW (μm) | Angle of incidence θ (°) | Refractive index of substrate | Refractive index of first low refractive index layer | Refractive index of high refractive index layer | Refractive index of second low refractive index layer | Height $d_1$ of first low refractive index layer (μm) | Height $d_2$ of high refractive index layer (μm) | Height $d_3$ of second low refractive index layer (μm) |
|---|---|---|---|---|---|---|---|---|---|
| Comparative Example 3 | −0.20 | 50 | 1.45 | 1.45 | 2.20 | 1.45 | 0.1618 | 1.1139 | 0.2682 |
| Comparative Example 4 | −0.14 | 50 | 1.45 | 1.45 | 2.20 | 1.45 | 0.1618 | 1.1139 | 0.2682 |
| Comparative Example 5 | −0.10 | 50 | 1.45 | 1.45 | 2.20 | 1.45 | 0.1618 | 1.1139 | 0.2682 |
| Comparative Example 6 | −0.08 | 50 | 1.45 | 1.45 | 2.20 | 1.45 | 0.1618 | 1.1139 | 0.2682 |
| Comparative Example 7 | −0.06 | 50 | 1.45 | 1.45 | 2.20 | 1.45 | 0.1618 | 1.1139 | 0.2682 |
| Comparative Example 8 | −0.04 | 50 | 1.45 | 1.45 | 2.20 | 1.45 | 0.1618 | 1.1139 | 0.2682 |
| Comparative Example 9 | −0.02 | 50 | 1.45 | 1.45 | 2.20 | 1.45 | 0.1618 | 1.1139 | 0.2682 |
| Design Example 11 | 0.00 | 50 | 1.45 | 1.45 | 2.20 | 1.45 | 0.1618 | 1.1139 | 0.2682 |
| Comparative Example 10 | 0.02 | 50 | 1.45 | 1.45 | 2.20 | 1.45 | 0.1618 | 1.1139 | 0.2682 |
| Comparative Example 11 | 0.04 | 50 | 1.45 | 1.45 | 2.20 | 1.45 | 0.1618 | 1.1139 | 0.2682 |
| Comparative Example 12 | 0.06 | 50 | 1.45 | 1.45 | 2.20 | 1.45 | 0.1618 | 1.1139 | 0.2682 |
| Comparative Example 13 | 0.08 | 50 | 1.45 | 1.45 | 2.20 | 1.45 | 0.1618 | 1.1139 | 0.2682 |

TABLE 5-continued

| | | | | | | | | | |
|---|---|---|---|---|---|---|---|---|---|
| Comparative Example 14 | 0.10 | 50 | 1.45 | 1.45 | 2.20 | 1.45 | 0.1618 | 1.1139 | 0.2682 |
| Comparative Example 15 | 0.14 | 50 | 1.45 | 1.45 | 2.20 | 1.45 | 0.1618 | 1.1139 | 0.2682 |
| Comparative Example 16 | 0.20 | 50 | 1.45 | 1.45 | 2.20 | 1.45 | 0.1618 | 1.1139 | 0.2682 |

| | A (μm) | B (μm) | D (μm) | E (μm) | Cross-sectional area S of high refractive index layer (μm²) | Wavelength band (μm) | Average diffraction efficiency |
|---|---|---|---|---|---|---|---|
| Comparative Example 3 | 0.2820 | 0.3135 | 0.4583 | 0.4813 | 0.4299 | 1.50-1.60 | 0.6456 |
| Comparative Example 4 | 0.3420 | 0.3735 | 0.5183 | 0.5413 | 0.4967 | 1.50-1.60 | 0.8010 |
| Comparative Example 5 | 0.3820 | 0.4135 | 0.5583 | 0.5813 | 0.5412 | 1.50-1.60 | 0.8746 |
| Comparative Example 6 | 0.4020 | 0.4335 | 0.5783 | 0.6013 | 0.5635 | 1.50-1.60 | 0.9069 |
| Comparative Example 7 | 0.4220 | 0.4535 | 0.5983 | 0.6213 | 0.5858 | 1.50-1.60 | 0.9373 |
| Comparative Example 8 | 0.4420 | 0.4735 | 0.6183 | 0.6413 | 0.6081 | 1.50-1.60 | 0.9630 |
| Comparative Example 9 | 0.4620 | 0.4935 | 0.6383 | 0.6613 | 0.6304 | 1.50-1.60 | 0.9800 |
| Design Example 11 | 0.4820 | 0.5135 | 0.6583 | 0.6813 | 0.6526 | 1.50-1.60 | 0.9849 |
| Comparative Example 10 | 0.5020 | 0.5335 | 0.6783 | 0.7013 | 0.6749 | 1.50-1.60 | 0.9765 |
| Comparative Example 11 | 0.5220 | 0.5535 | 0.6983 | 0.7213 | 0.6972 | 1.50-1.60 | 0.9566 |
| Comparative Example 12 | 0.5420 | 0.5735 | 0.7183 | 0.7413 | 0.7195 | 1.50-1.60 | 0.9292 |
| Comparative Example 13 | 0.5620 | 0.5935 | 0.7383 | 0.7613 | 0.7417 | 1.50-1.60 | 0.8981 |
| Comparative Example 14 | 0.5820 | 0.6135 | 0.7583 | 0.7813 | 0.7640 | 1.50-1.60 | 0.8660 |
| Comparative Example 15 | 0.6220 | 0.6535 | 0.7983 | 0.8213 | 0.8086 | 1.50-1.60 | 0.8011 |
| Comparative Example 16 | 0.6820 | 0.7135 | 0.8583 | 0.8813 | 0.8754 | 1.50-1.60 | 0.6866 |

Figure 24:
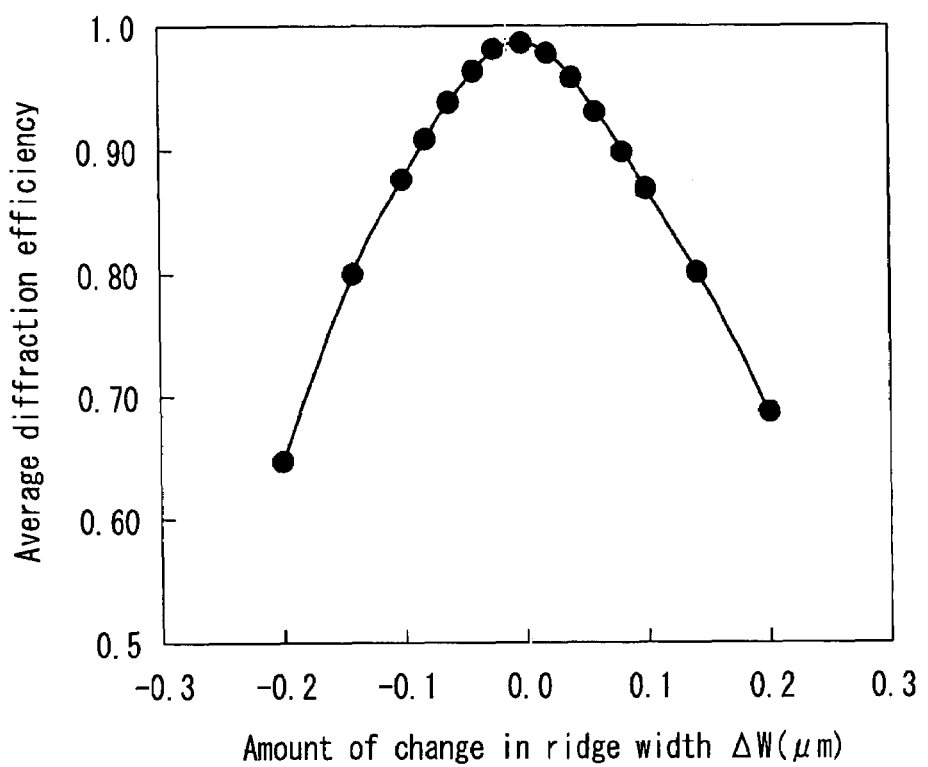
FIG. 24 is a graph showing the relationship between the average diffraction efficiency and the amount of change in the ridge width in Comparative Examples 3 to 16 of Embodiment 2 of the present invention.

The average diffraction efficiencies of the respective comparative examples also are listed above (Table 5). In addition, FIG. 24 illustrates the relationship between the amount of change in ridge width ΔW and average diffraction efficiency. As shown in FIG. 24, when the width of the ridge changes, the cross-sectional area of the high refractive index layer 12 changes as well, resulting in a rapid decrease in the average diffraction efficiency.

DESIGN EXAMPLES 19 to 30

Design Examples 19 to 30 are examples of a design, in which optimization was conducted using a simple rectangular shape as the cross-sectional shape of the ridges. Results obtained by optimizing the thickness $d_1$ of the first low refractive index layer, the thickness $d_2$ of the high refractive index layer, the thickness $d_3$ of the second low refractive index layer, and the width W of the ridges at three angles of incidence θ of 35°, 45°, and 55° and four refractive indices of the high refractive index layer, i.e. 2.00, 2.10, 2.25, and 2.50, are shown below (Table 6). Optimization was carried out by obtaining first-order diffraction efficiencies (both TE-polarized light and TM-polarized light) for eleven wavelengths (interval: 0.01 μm) in different wavelength band ranges (depending on the angle of incidence θ) and performing optimization with a view to increase their average value (referred to as "average diffraction efficiency" below) as much as possible.

TABLE 6

| | Angle of incidence θ (°) | Refractive index of substrate | Refractive index of first low refractive index layer | Refractive index of high refractive index layer | Refractive index of second low refractive index layer | Height $d_1$ of first low refractive index layer (μm) |
|---|---|---|---|---|---|---|
| Design Example 19 | 35 | 1.45 | 1.45 | 2.00 | 1.45 | 0.5259 |
| Design Example 20 | 35 | 1.45 | 1.45 | 2.10 | 1.45 | 0.5072 |
| Design Example 21 | 35 | 1.45 | 1.45 | 2.25 | 1.45 | 0.5610 |

TABLE 6-continued

| | | | | | | | Height $d_2$ of high refractive index layer (μm) | Height $d_3$ of second low refractive index layer (μm) | Ridge width W (μm) | Cross-sectional area S of high refractive index layer (μm²) | Wavelength band (μm) | Average diffraction efficiency |
|---|---|---|---|---|---|---|---|---|---|---|---|---|
| Design Example 22 | 35 | 1.45 | 1.45 | 2.50 | 1.45 | 0.6175 | | | | | | |
| Design Example 23 | 45 | 1.45 | 1.45 | 2.00 | 1.45 | 0.0500 | | | | | | |
| Design Example 24 | 45 | 1.45 | 1.45 | 2.10 | 1.45 | 0.1442 | | | | | | |
| Design Example 25 | 45 | 1.45 | 1.45 | 2.25 | 1.45 | 0.0968 | | | | | | |
| Design Example 26 | 45 | 1.45 | 1.45 | 2.50 | 1.45 | 0.1313 | | | | | | |
| Design Example 27 | 55 | 1.45 | 1.45 | 2.00 | 1.45 | 0.2533 | | | | | | |
| Design Example 28 | 55 | 1.45 | 1.45 | 2.00 | 1.45 | 0.2423 | | | | | | |
| Design Example 29 | 55 | 1.45 | 1.45 | 2.25 | 1.45 | 0.2042 | | | | | | |
| Design Example 30 | 55 | 1.45 | 1.45 | 2.50 | 1.45 | 0.2301 | | | | | | |
| Design Example 19 | | | | | | | 0.7158 | 0.2669 | 0.5224 | 0.3739 | 1.10-1.20 | 0.98390 |
| Design Example 20 | | | | | | | 0.7158 | 0.2263 | 0.5221 | 0.3737 | 1.10-1.20 | 0.96580 |
| Design Example 21 | | | | | | | 0.5827 | 0.2676 | 0.4525 | 0.2637 | 1.10-1.20 | 0.96635 |
| Design Example 22 | | | | | | | 0.4986 | 0.1648 | 0.4002 | 0.1995 | 1.10-1.20 | 0.96154 |
| Design Example 23 | | | | | | | 1.3092 | 0.3606 | 0.6168 | 0.8075 | 1.40-1.50 | 0.97525 |
| Design Example 24 | | | | | | | 1.1018 | 0.2162 | 0.5640 | 0.6214 | 1.40-1.50 | 0.98340 |
| Design Example 25 | | | | | | | 1.0604 | 0.2003 | 0.5386 | 0.5711 | 1.40-1.50 | 0.96105 |
| Design Example 26 | | | | | | | 0.8974 | 0.2352 | 0.5420 | 0.4864 | 1.40-1.50 | 0.92410 |
| Design Example 27 | | | | | | | 1.6899 | 0.3254 | 0.7121 | 1.2034 | 1.62-1.72 | 0.97675 |
| Design Example 28 | | | | | | | 1.2646 | 0.2537 | 0.6112 | 0.7729 | 1.62-1.72 | 0.96935 |
| Design Example 29 | | | | | | | 1.1594 | 0.2859 | 0.6054 | 0.7019 | 1.62-1.72 | 0.98215 |
| Design Example 30 | | | | | | | 1.0329 | 0.2819 | 0.5889 | 0.6083 | 1.62-1.72 | 0.95505 |

By analyzing the above-described Design Examples 1 to 30, the present inventors found that, for a given periodicity p of the diffraction grating, the important parameters, such as the angle of incidence θ, the refractive index $n_2$ of the high refractive index layer, the cross-sectional area S of the high refractive index layer, and the thickness $d_2$ of the high refractive index layer, roughly satisfy the following relationships: $S=p^2k_1\theta^2/(n_2-1)$ and $d_2=pk_2\theta n_2/(n_2-1)$. Here, θ is in radian units and the constants $k_1$ and $k_2$ are, respectively $k_1=1.1$ and $k_2=0.69$.

Figure 25:
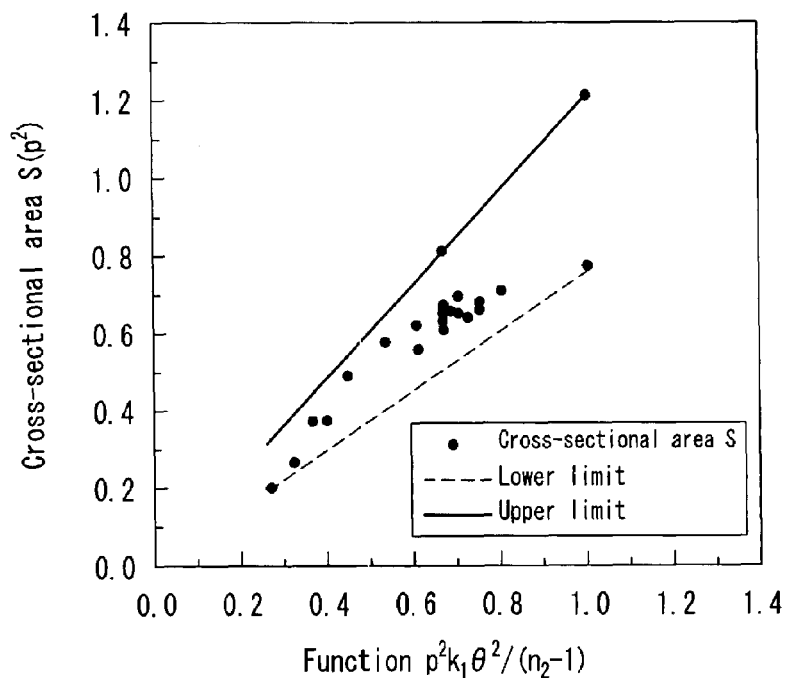
FIG. 25 is a graph, in which the value of $p^2 k_1 \theta^2/(n_2-1)$ is plotted long the x-axis and the value of the cross-sectional area S of the high refractive index layer is plotted along the y-axis for Design Examples 1 to 30 of the present invention.

FIG. 25 is a graph in which the value of $p^2k_1\theta^2/(n_2-1)$ is plotted long the x-axis and the value of the cross-sectional area S of the high refractive index layer is plotted along the y-axis for Design Examples 1 to 30. As can be seen from FIG. 25, there is an extremely close correlation between the two. It should be noted that the two straight lines shown in FIG. 25 satisfy the relationships $S=0.75\ p^2k_1\theta^2/(n_2-1)$ and $5=1.20\ p^2k_1\theta^2/(n_2-1)$. Because all of the points are within the range that lies between these two straight lines, the cross-sectional area S of the high refractive index layer preferably is in the range of $0.75\ p^2k_1\theta^2/(n_2-1)<S<1.20\ p^2k_1\theta^2/(n_2-1)$.

Figure 26:
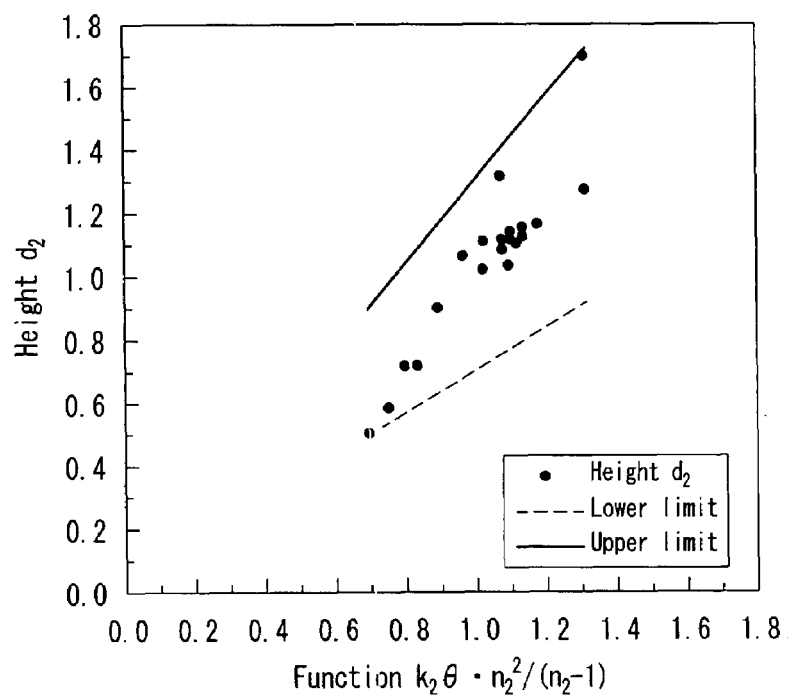
FIG. 26 is a graph, in which the value of $p k_2 \theta n_2/(n_2-1)$ is plotted along the x-axis and the value of the thickness $d_2$ of the high refractive index layer is plotted along the Y-axis for Design Examples 1-30 of the present invention.

In addition, FIG. 26 is a graph in which the value of $pk_2\theta n_2/(n_2-1)$ is plotted along the x-axis and the value of the thickness $d_2$ of the high refractive index layer is plotted along the y-axis for Design Examples 1 to 30. As can be seen from FIG. 26, there is an extremely close correlation between the two. It should be noted that the two straight lines shown in FIG. 26 satisfy the relationships $d_2=0.70\ pk_2\theta n_2/(n_2-1)$ and $d_2=1.30\ pk_2\theta n_2/(n_2-1)$. Because all of the points are within the range that lies between these two straight lines, the thickness $d_2$ of the high refractive index layer preferably is in the range of $0.70\ pk_2\theta n_2/(n_2-1)<d_2<1.30\ pk_2\theta n_2/(n_2-1)$.

Embodiment 3

Figure 27:
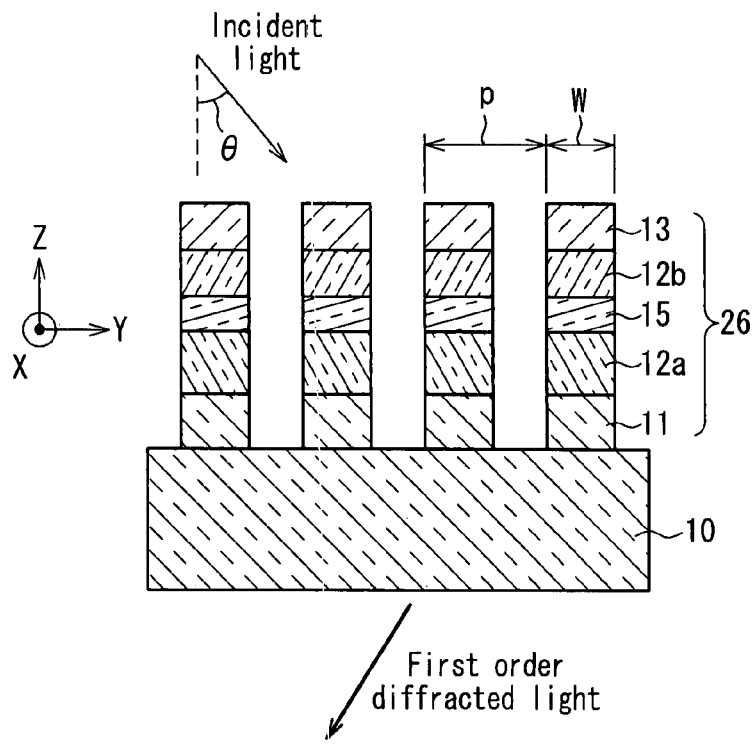
FIG. 27 is a cross-sectional view illustrating a transmissive diffraction grating in Embodiment 3 of the present invention.

FIG. 27 is a cross-sectional view illustrating a diffraction grating in Embodiment 3 of the present invention. As shown in FIG. 27, the diffraction grating of the present embodiment has a five-layer ridge structure, in which a low refractive index layer is sandwiched between high refractive index layers. More specifically, the diffraction grating of the present embodiment includes a substrate 10 and a plurality of rectangular ridges 26 provided in a mutually parallel manner at constant periodicity p on the substrate 10. Here, the ridges 26 are made of five layers arranged in succession from the substrate 10 outward: a first low refractive index layer (first layer) 11, a first high refractive index layer (second layer) 12a, a third low refractive index layer (third layer) 15, a second high refractive index layer (fourth layer) 12b, and a second low refractive index layer (fifth layer) 13. The first high refractive index layer 12a and second high refractive index layer 12b have higher refractive indices in comparison with the first low refractive index layer 11, third low refractive index layer 15, and second low refractive index layer 13.

According to the present embodiment, dividing the high refractive index layer makes it possible to use the respective thicknesses of the first high refractive index layer 12a, third low refractive index layer 15, and second high refractive index layer 12b as design parameters, thereby increasing the degree of freedom in design and permitting fabrication of a diffraction grating with improved characteristics in comparison with the above-described Embodiment 1 (FIG. 1). Specifically, as will be shown in the hereinafter described design examples, it becomes possible to widen the bandwidth within which a high diffraction efficiency can be obtained.

Design examples of the transmissive diffraction grating (FIG. 27) explained above are shown below.

DESIGN EXAMPLE 31

Figure 28:
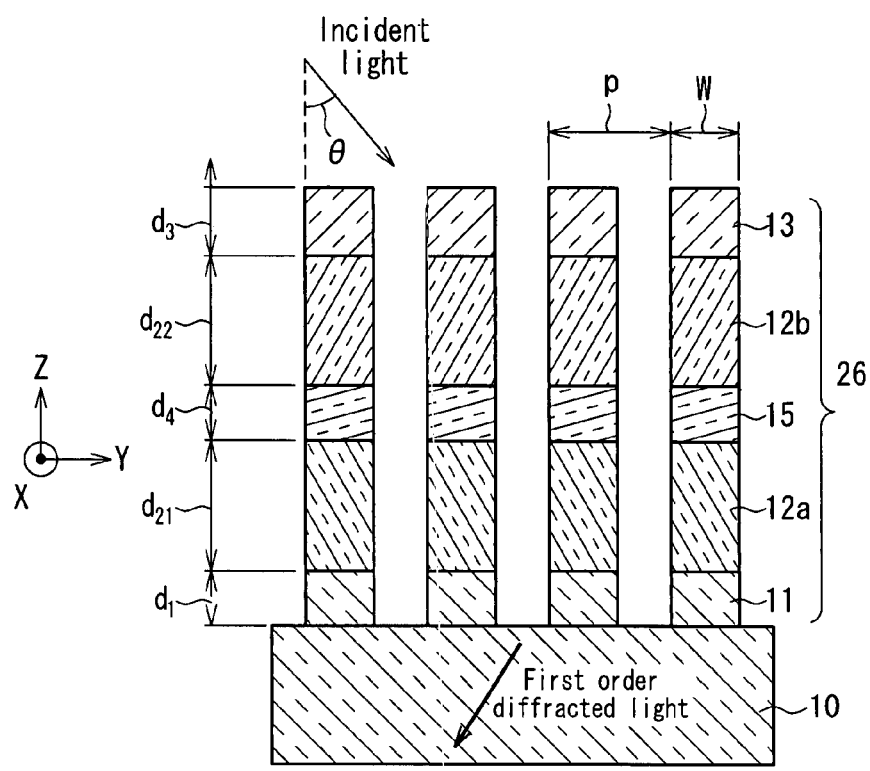
FIG. 28 is a view of Design Example 31 of Embodiment 3 of the present invention used for explaining numerical values used in the calculations.

Design Example 31 describes a case with a five-layer ridge structure. As shown in FIG. 28, the periodicity of the diffraction grating is designated as p, the width of the ridges 26 as W, and the thicknesses of the first low refractive index layer 11, first high refractive index layer 12a, third low refractive index layer 15, second high refractive index layer 12b, and second low refractive index layer 13 respectively as $d_1$, $d_{21}$, $d_4$, $d_{22}$, and $d_3$. Moreover, the refractive indices of the first low refractive index layer 11, first high refractive index layer 12a, third low refractive index layer 15, second high refractive index layer 12b, second low refractive index layer 13, and substrate 10 are designated respectively as $n_1$, $n_{21}$, $n_4$, $n_{22}$, $n_3$, and $n_s$. Regions other than the substrate 10 and ridges 26 are considered to be air (refractive index: 1).

In Design Example 31, the angle of incidence θ onto the diffraction grating face was set to 50°, the periodicity p of the diffraction grating to 1 μm, the refractive indices of the first low refractive index layer 11, first high refractive index layer 12a, third low refractive index layer 15, second high refractive index layer 12b, second low refractive index layer 13, and substrate 10 to, respectively, $n_1$=1.45, $n_{21}$=2.10, $n_4$=1.45, $n_{22}$=2.10, $n_3$=1.45, and $n_s$=1.45, while the other parameters were optimized, including the thickness $d_1$ of the first low refractive index layer 11, the thickness $d_{21}$ of the first high refractive index layer 12a, the thickness $d_4$ of the third low refractive index layer 15, the thickness $d_{22}$ of the second high refractive index layer 12b, the thickness $d_3$ of the second low refractive index layer 13 and the width W of the ridges 26. The optimization was conducted with a view to increase, on the average, the diffraction efficiency in the wavelength band range of from 1.400 μm to 1.600 μm. The results obtained are shown below.

$d_1$=0.0022 μm
$d_{21}$=0.4878 μm
$d_4$=0.0520 μm
$d_{22}$=0.6603 μm
$d_3$=0.3000 μm
W=0.5751 μm

Figure 29:
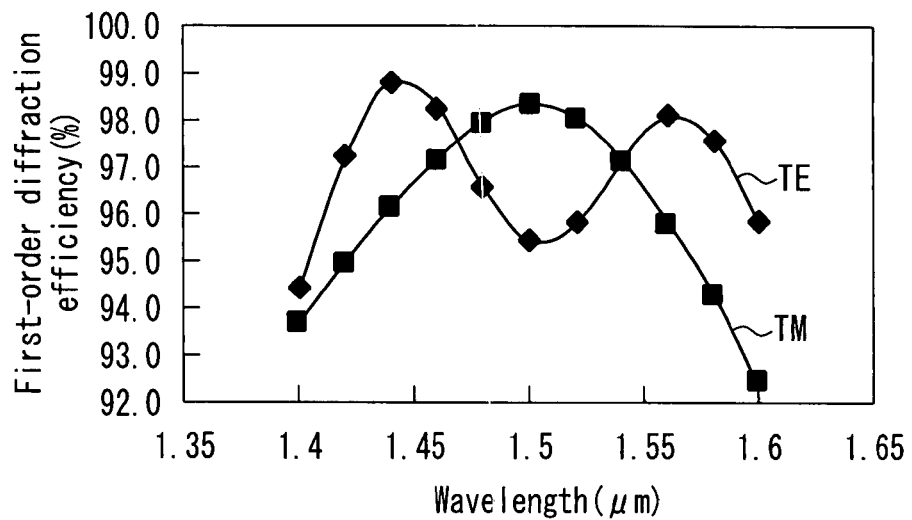
FIG. 29 is a graph showing the diffraction efficiency of first-order diffracted light versus the wavelength of incident light in Design Example 31 of Embodiment 3 of the present invention.

FIG. 29 shows the diffraction efficiency of first-order diffracted light versus the wavelength of incident light. As shown in FIG. 29, within the wavelength band, both TE-polarized light and TM-polarized light produced extremely good diffraction efficiency values exceeding 92%, with the bandwidth within which a high efficiency of diffraction can be obtained, being wider than in case of the three-layer ridge structure (the hereinafter described Design Example 32).

DESIGN EXAMPLE 32

In Design Example 32, for comparison with Design Example 31, the same optimization was carried out under the same conditions except for changing the five-layer ridge structure to a three-layer ridge structure. The thicknesses of the first low refractive index layer, high refractive index layer, and second low refractive index layer are respectively $d_1$, $d_2$, and $d_3$. Moreover, the refractive indices of the first low refractive index layer, high refractive index layer, second low refractive index layer, and the substrate are respectively $n_1$, $n_2$, $n_3$, and $n_s$. Regions other than the substrate and ridges are considered to be air (refractive index: 1).

In Design Example 32, the angle of incidence θ onto the diffraction grating face was set to 50°, the periodicity p of the diffraction grating to 1 μm, the refractive indices of the first low refractive index layer, high refractive index layer, second low refractive index layer, and the substrate respectively to $n_1$=1.45, $n_2$=2.10, $n_3$=1.45, and $n_s$=1.45 while the other parameters were optimized, including the thickness $d_1$ of the first low refractive index layer, the thickness $d_2$ of the high refractive index layer, the thickness $d_3$ of the second low refractive index layer, and the width W of the ridges. The optimization was conducted with a view to increase, on the average, the diffraction efficiency in the wavelength band range of from 1.400 μm to 1.600 μm. The results obtained are shown below.

$d_1$=0.0979 μm
$d_2$=1.1478 μm
$d_3$=0.2611 μm
W=0.5682 μm

Figure 30:
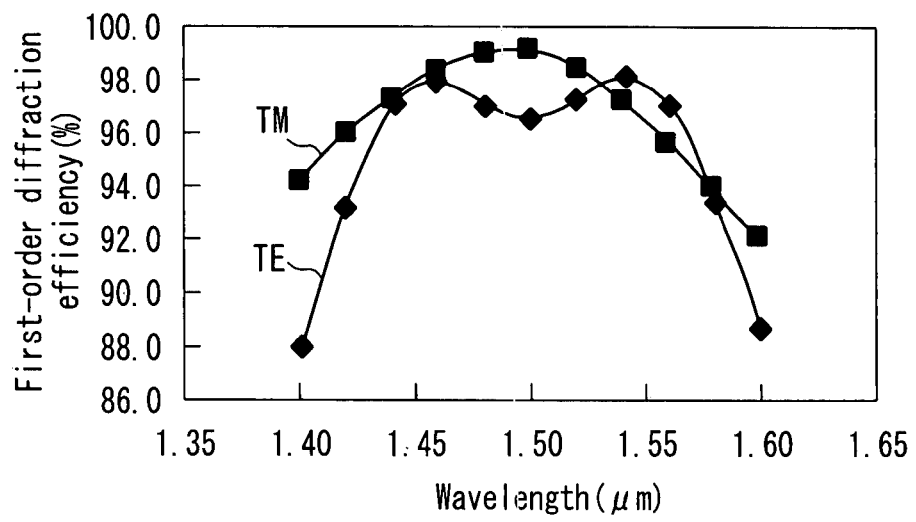
FIG. 30 is a graph showing the diffraction efficiency of first-order diffracted light versus the wavelength of incident light in Design Example 32 of Embodiment 3 of the present invention.

FIG. 30 shows the diffraction efficiency of first-order diffracted light versus the wavelength of incident light. As shown in FIG. 30, the diffraction efficiency of TE-polarized light at both ends of the wavelength band falls lower than in the case of Design Example 31.

Embodiment 4

Figure 31:
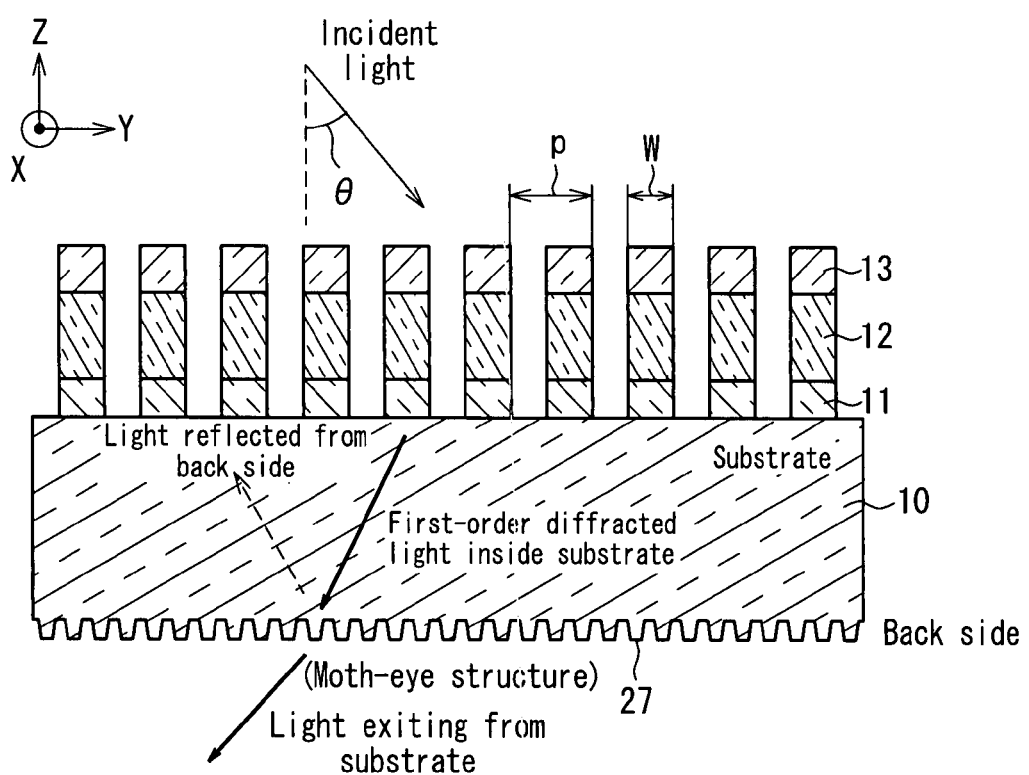
FIG. 31 is a cross-sectional view schematically illustrating a transmissive diffraction grating in Embodiment 4 of the present invention.

FIG. 31 is a cross-sectional view schematically illustrating a diffraction grating in Embodiment 4 of the present invention.

Because Fresnel reflection at the back side of the substrate 10 results in losses, it is desirable to provide some antireflection means on the back side of the substrate 10.

A coating (antireflection film) made of up of a single-layer or multi-layer film is commonly used as such antireflection means. Incidentally, in the diffraction grating of the present invention, the angle of emission is practically equal to the angle of incidence, and, as a result, the angle of emission has a large value of 35° to 55°. Also, due to the considerable angle-dependent changes in reflectance in the above-described antireflection film, it is necessary to increase the number of layers in order to achieve low reflectance over a wide angular range, which increases the cost.

Moth-eye structures are known as antireflection means exhibiting little angular dependence. FIG. 31 schematically illustrates a diffraction grating with a moth-eye structure used as antireflection means. As shown in FIG. 31, a plurality of mutually parallel fine second ridges 27 are provided on the face (back side) of the substrate 10 opposite the diffraction grating face (the face on which the first low refractive index layer 11, high refractive index layer 12, and second low refractive index: layer 13 are formed). The second ridges 27 extend in the direction of the X-axis and exhibit periodicity in the direction of the Y-axis. Making the periodicity of the second ridges 27 sufficiently smaller than the wavelength of light causes no diffracted light to be generated and the average refractive index of the second ridge portion falls in the middle between the substrate and air, as a result of which reflection-decreasing effects are produced. Moreover, moth-eye structures can be fabricated at a cheaper cost than antireflection films with multiple layers using the so-called nanoimprinting, in which a resin layer or a sol-gel glass layer is formed on the surface of a substrate and then subjected to imprinting using a mold.

Accordingly, in the present invention, it is preferable that one of the faces of the substrate is a diffraction grating face, and the other face is a moth-eye structure as antireflection means.

(Moth-eye Structure Design Example)

Figure 32:
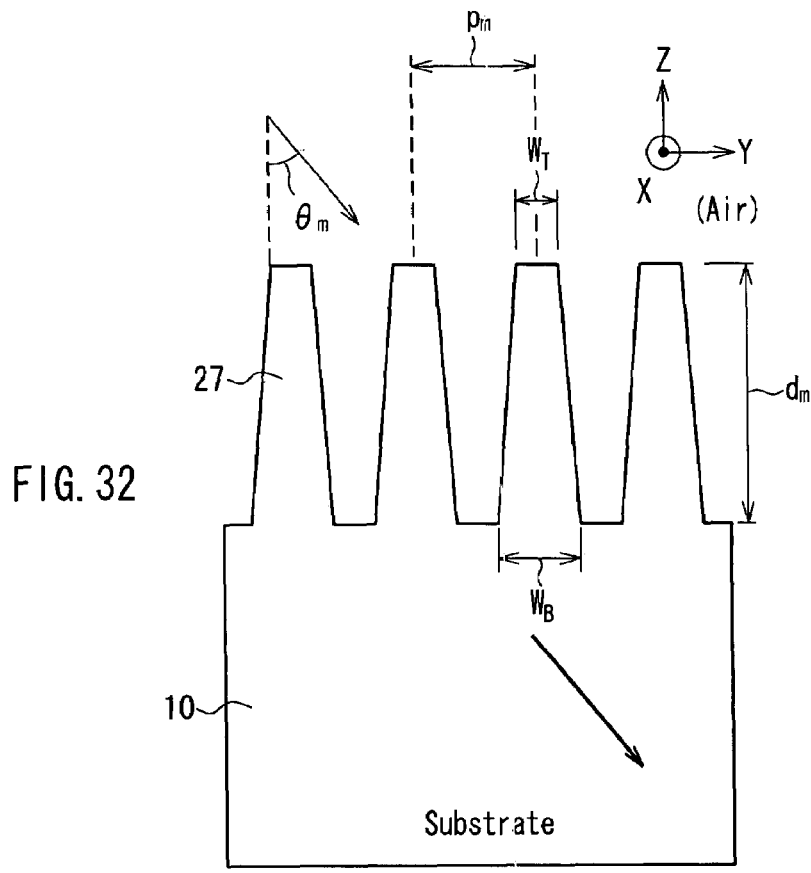
FIG. 32 is a view of the transmissive diffraction grating of Embodiment 4 of the present invention used for explaining numerical values used in the calculations.
Figure 33:
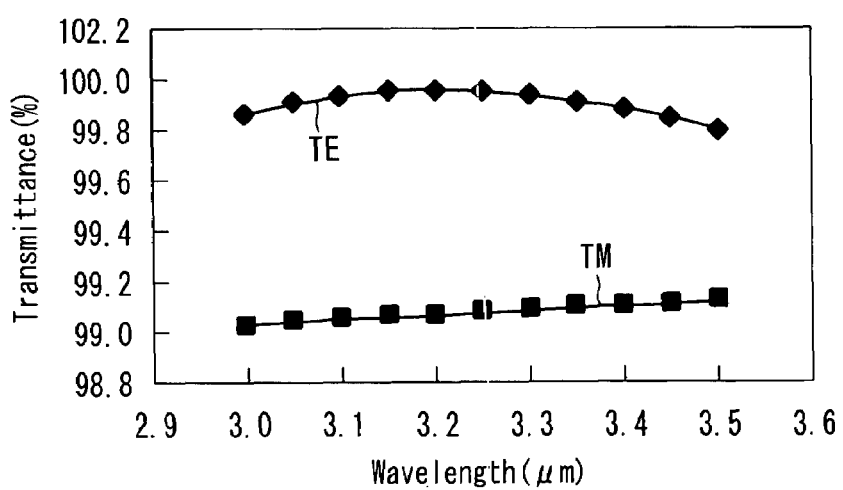
FIG. 33 is a graph showing the transmittance of transmitted light versus the wavelength of incident light in Embodiment 4 of the present invention.

FIG. 32 is a view for explaining numerical values of the transmissive diffraction grating of Embodiment 4 of the present invention used in the calculations. In the present design example, the periodicity $p_m$ of the second ridges 27 is set to 1 µm, the width $W_B$ of the second ridges 27 at the surface of the substrate 10 to 0.4088 µm, the width $W_T$ of the second ridges 27 at the tips thereof to 0.8 $W_B$, the height $d_m$ of the second ridges 27 to 0.8567 µm, and the refractive index of the substrate 10 and second ridges 27 to 1.45. FIG. 33 shows results obtained by calculating the respective transmittances when plane waves (TE-polarized light and TM-polarized light) are incident from the air at an angle of incidence of $\Theta_m = 45°$.

As shown in FIG. 33, in the wavelength band of 3.0 µm to 3.5 µm, the transmittance of TE-polarized light has an extremely good value of 99.8% or higher. The transmittance of TM-polarized light, which is 99.0% to 99.2%, is somewhat inferior to that of TE-polarized light and thus produces slight PDL.

Embodiment 5

Although the above-described Embodiments 1 through 4 provided explanations regarding a diffraction grating, here, explanations will be provided regarding a spectral separation element, in which the diffraction grating is used in multiple stages for the purpose of increasing angular dispersion, as well as regarding an example of its application to a spectroscope.

Figure 34:
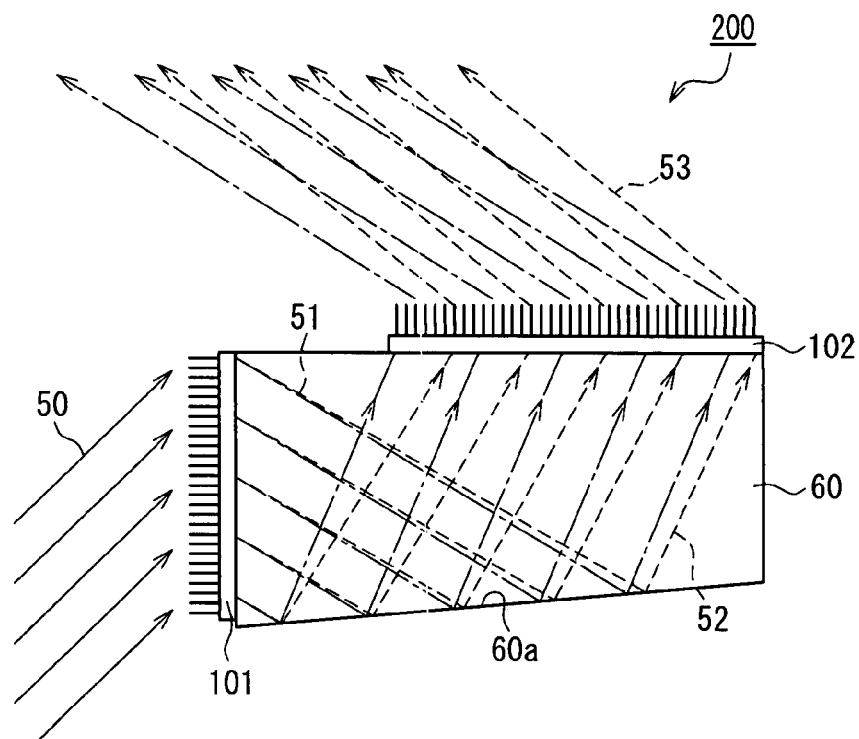
FIG. 34 is a cross-sectional view illustrating a spectral separation element used in Embodiment 5 of the present invention.

FIG. 34 is a cross-sectional view illustrating a spectral separation element in Embodiment 5 of the present invention. In this spectral separation element, diffraction gratings are provided in two stages so as to increase angular dispersion. As shown in FIG. 34, in a spectral separation element 200 of the present embodiment, first and second diffraction gratings 101, 102 of the present invention are bonded to two sides of a prism 60 made of glass or another transparent material such that they are practically perpendicular to each other. Incident light 50 is diffracted by the first diffraction grating 101, producing diffracted light 51. This diffracted light 51 undergoes total reflection at a face 60a of the prism 60 and becomes reflected light 52. The reflected light 52 is then diffracted by the second diffraction grating 102, emitted outside the prism 60, and produces emitted light 53. In this manner, diffraction takes place twice, thereby almost doubling the angular dispersion.

Figure 35:
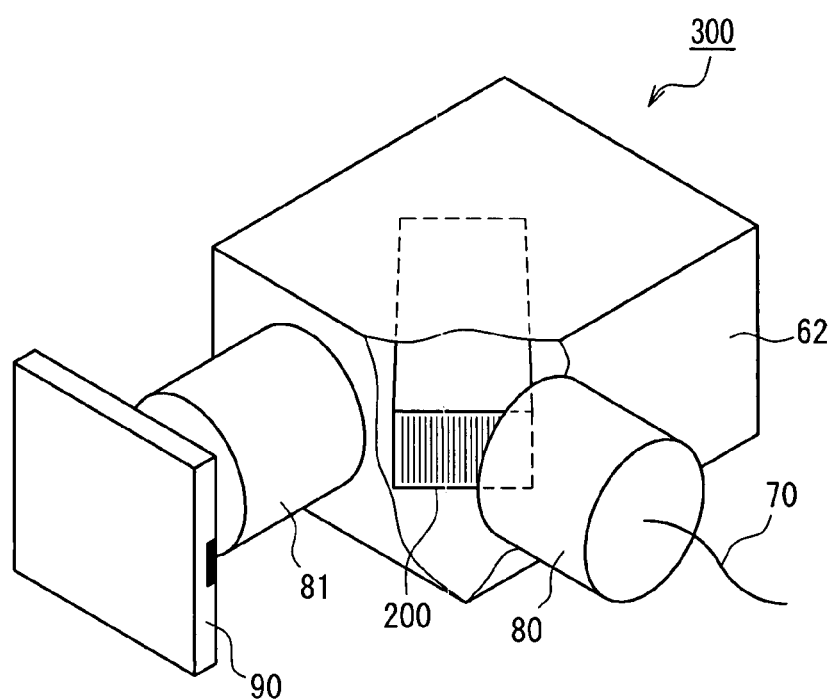
FIG. 35 is a perspective view illustrating a spectroscope in Embodiment 5 of the present invention.

FIG. 35 is a perspective view illustrating a spectroscope in Embodiment 5 of the present invention. As shown in FIG. 35, in a spectroscope 300 of the present embodiment, a collimator 80 equipped with an optical fiber 70, and an object lens 81 are provided on two sides of an enclosure 62 having a spectral separation element 200 provided therein. Light propagating along the optical fiber 70 is turned into a parallel beam of light by the collimator 80 and is incident on the spectral separation element 200. As described above, the light that is incident upon the spectral separation element 200 undergoes double diffraction, and, as a result, turns into diffracted light whose angular diffraction is almost doubled. The diffracted light is then converged by the object lens 81 and emitted from the spectroscope 300. Furthermore, if a line sensor 90 is arranged at the focal position of the object lens 81, the spectroscope 300 will be capable of measuring light intensities for each wavelength at once and will be suitable for use as a spectral sensor for chemical analysis.

The transmissive diffraction grating of the present invention can be used in measuring equipment, such as spectrometers, as well as in reading and writing heads of optical disk recording/reproducing devices, in optical communications, etc.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A transmissive diffraction grating comprising a substrate and a plurality of ridges provided parallel to one another at constant periodicity p on the substrate,
   wherein the ridges include a first layer, a second layer, and a third layer with non-continuous refractive indices arranged in that order from the substrate outward,
   the first layer adjacent the substrate, in terms of its refractive index, exhibits a difference of 0.1 or less relative to the substrate,
   the second layer has a higher refractive index than the first layer and third layer and satisfies the following conditions (A) to (C):
   (A) the refractive index $n_2$ of the second layer is 2.0 to 2.5;
   (B) for a single ridge, a cross-sectional area S of a cross-section of the second layer perpendicular to the longitudinal direction of said ridge is in the range of $0.75p^2 k_1 \theta^2/(n_2-1) < S < 1.20p^2 k_1 \theta^2/(n_2-1)$, where, $\theta$ is the angle of incidence onto the diffraction grating face, expressed in radian units, and the constant $k_1$ is 1.1; and
   (C) a thickness $d_2$ of the second layer is in the range of $0.70 p k_2 \theta n_2/(n_2-1) < d_2 < 1.30 p k_2 \theta n_2/(n_2-1)$, where, the constant $k_2$ is 0.69.

2. The transmissive diffraction grating according to claim 1, wherein a cross-section of the ridge perpendicular to the longitudinal direction of said ridge comprises a substantially rectangular first portion adjacent the substrate and an outwardly converging tapered second portion adjacent the first portion, and
   a height $h_1$ of the first portion from the surface of the substrate is in the range of $0.2h < h_1 < 0.7h$, where the height of the ridge from the surface of the substrate is designated as h, and
   an angle $\phi_1$ between the normal to the surface of the substrate and the side face of the ridge in the first portion and an angle $\phi_2$ between the normal to the surface of the substrate and the side face of the ridge in the second portion is in the range of $0°<\phi_1<5°$, $\phi_1<\phi_2<15°$.

3. The transmissive diffraction grating according to claim 1, wherein a plurality of mutually parallel second ridges are provided periodically on the face of the substrate on the side opposite the diffraction grating face.

4. The transmissive diffraction grating according to claim 1, wherein the refractive index of the first layer is the same as the refractive index of the substrate.

5. The transmissive diffraction grating according to claim 1, wherein the refractive index of the first layer is the same as the refractive index of the third layer.

6. The transmissive diffraction grating according to claim 1, wherein the first layer is made of silicon dioxide and the substrate is made of quartz glass.

7. The transmissive diffraction grating according to claim 1, wherein the first layer comprises a portion of the substrate.

8. The transmissive diffraction grating according to claim 7, wherein the substrate is made of quartz glass.

9. The transmissive diffraction grating according to claim 1, wherein the second layer is made of at least one type of material selected from the group consisting of $Ta_2O_5$, $TiO_2$, and $Nb_2O_5$.

10. The transmissive diffraction grating according to claim 9, wherein the second layer is made of $Ta_2O_5$.

11. The transmissive diffraction grating according to claim 1, wherein the second layer, which is a high refractive index layer, is adapted so as to be divided into two portions sandwiching a low refractive index layer.

12. The transmissive diffraction grating according to claim 1, wherein the angle of incidence $\theta$ during reception of light normal to the longitudinal direction of the ridges satisfies the condition $|\theta-\theta_0|<10°$, where, $\theta_0$ is defined by $n_i \cdot \sin\theta_0 (p/\lambda_0)=0.5$, where $\lambda_0$ is the center value of a wavelength band of incident light in a vacuum, and $n_i$ is the refractive index of a medium on the entrance side.

13. A spectral separation element utilizing a plurality of transmissive diffraction gratings according to claim 1.

14. A spectroscope utilizing the spectral separation element according to claim 13.

15. A spectroscope utilizing the transmissive diffraction grating according to claim 1.

* * * * *